(12) United States Patent
Hattori

(10) Patent No.: US 6,377,360 B1
(45) Date of Patent: *Apr. 23, 2002

(54) COPIER

(75) Inventor: Yutaka Hattori, Kuwana (JP)

(73) Assignee: Brother Kogyo Kabushiki Kaisha, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,700

(22) Filed: Nov. 13, 1997

(30) Foreign Application Priority Data

Nov. 19, 1996 (JP) .............................. 8-308546

(51) Int. Cl.[7] .............................................. B41B 15/00
(52) U.S. Cl. ........................ 358/1.5; 358/296; 358/451
(58) Field of Search .................... 358/401, 404, 358/442, 444, 434, 437, 468, 296, 474, 475, 486, 484, 1.1, 1.2, 1.3, 1.9, 1.14, 1.16, 1.17, 1.18, 1.5, 451; 395/101, 102, 103, 109, 113, 115, 116, 117; 355/49, 37, 61, 81, 83, 84

(56) References Cited

U.S. PATENT DOCUMENTS

| | | | | | |
|---|---|---|---|---|---|
| 3,272,918 A | * | 9/1966 | Koll et al. | .................. | 358/296 |
| 3,541,245 A | * | 11/1970 | Wilby | ........................ | 358/296 |
| 4,205,350 A | * | 5/1980 | Gunning | ..................... | 358/296 |
| 4,317,137 A | * | 2/1982 | Tompkins | .................... | 358/286 |
| 4,532,602 A | * | 7/1985 | Duvall | ......................... | 364/577 |
| 4,733,308 A | * | 3/1988 | Nakamura et al. | .......... | 358/288 |
| 5,107,106 A | * | 4/1992 | Minegishi et al. | .......... | 358/481 |
| 5,223,952 A | * | 6/1993 | Anzai | .......................... | 358/474 |
| 5,239,387 A | * | 8/1993 | Stein et al. | ................. | 358/486 |
| 5,402,208 A | * | 3/1995 | Ohmura et al. | ............. | 358/486 |
| 5,408,266 A | * | 4/1995 | Ikeyama et al. | ............ | 348/222 |
| 5,481,365 A | * | 1/1996 | Arimoto | .................... | 358/296 |
| 5,483,054 A | * | 1/1996 | Hachisuga | .................. | 250/235 |
| 5,488,489 A | * | 1/1996 | Miyagawa | .................. | 358/474 |
| 5,604,597 A | * | 2/1997 | Imai | ........................... | 358/296 |
| 5,604,608 A | * | 2/1997 | Walsh et al. | ................ | 358/486 |
| 5,642,207 A | * | 6/1997 | Smitt | ......................... | 358/474 |
| 5,668,637 A | * | 9/1997 | Yamaguchi | .................. | 358/486 |
| 5,717,790 A | * | 2/1998 | Kanesaka et al. | ........... | 358/475 |
| 6,097,508 A | * | 8/2000 | Hattori | ........................ | 358/475 |

FOREIGN PATENT DOCUMENTS

JP     A 56-140315     11/1981

* cited by examiner

Primary Examiner—Kimberly A. Williams
(74) Attorney, Agent, or Firm—Oliff & Berridge PLC

(57) ABSTRACT

A copier is provided with: a photosensitive drum; a light source device for emitting light; a deflecting device for deflecting the emitted light in a main scanning direction; a light collecting device for collecting the deflected light, to thereby irradiate the original and the photosensitive drum with the collected light respectively; a guiding device for guiding the collected light to the original and the photosensitive drum respectively; a light detecting device for reading the image of the original by receiving a scattered light from the irradiated original; a sub-scanning direction moving device for relatively moving the collected light with respect to the original and the photosensitive drum respectively in a sub-scanning direction; a memory device for storing the image information for the each scanning line; a light recording device for recording the latent image onto the photosensitive drum for the each scanning line at a recording cycle by reading out the stored image information from the memory device and driving the light source device to emit the light on the basis of the read out image information; and a magnification control device for relatively varying the reading cycle and the recording cycle.

19 Claims, 19 Drawing Sheets

*RECORD DOT CLOCK CONSTANT

[ENLARGEMENT]

MAIN SCANNING DIRECTION →

SUB-SCANNING DIRECTION ↓

ORIGINAL READ PIXEL

RECORD PIXEL

[SHRINKAGE]

ORIGINAL READ PIXEL

RECORD PIXEL

*RECORD DOT CLOCK CONSTANT

[ENLARGEMENT]

ORIGINAL READ PIXEL

RECORD PIXEL

[SHRINKAGE]

ORIGINAL READ PIXEL

RECORD PIXEL

[ENLARGEMENT]

[SHRINKAGE]  ☆ THINNED-OUT PIXEL LINE

COPIER

BACKGROUND OF THE INVENTION

1. Field of the Invention

The present invention relates to a copier having an optically scanning device for scanning an original and scanning a photo-sensitive substance by using a light source such as a laser or the like.

2. Description of the Related Art

As a conventional apparatus for reading and recording an image by using a laser light, an apparatus which switches an optical path of a laser light between an original side and a photo-sensitive substance side by means of a reflection mirror etc. is known as disclosed in Japanese Patent Publication No. Hei 2-58605. This apparatus performs reading and recording operations in a main scanning direction by using: a polygon mirror for deflecting the laser light at a constant angular velocity; and an f θ lens for converting the angular deflecting operation into a linear scanning operation at a constant linear velocity. Further, the apparatus performs the reading operation in a sub-scanning direction by moving an original base, on which an original is placed, to a direction perpendicular to an incident direction of the light beam (i.e., perpendicular to the main scanning direction), and performs a recording operation in the sub-scanning direction by rotating the photo-sensitive substance such as a photosensitive drum.

However, a read width in the main scanning direction is fixed according to the above mentioned conventional apparatus, so that a length of an image read for each unit time is constant. Thus, in order to enlarge or shrink the image, it is necessary to once store the read image in a frame memory to thereby digitally process the stored information.

As a result, it is difficult to make a copy time shorter and implement a reduction of a cost needed for the frame memory.

SUMMARY OF THE INVENTION

It is therefore an object of the present invention to provide a copier equipped with a light source for emitting a light having a predetermined wave length, which can enlarge or shrink an original with a fast speed and a low cost.

The above object of the present invention can be achieved by a copier provided with: an original base on which an original is placed; a photo-sensitive substance on which a latent image corresponding to an image of the original is to be recorded; a light source device for emitting light; a deflecting device for deflecting the emitted light in a main scanning direction, to thereby perform a main scanning operation for each scanning line in the main scanning direction; a light collecting device for collecting the deflected light, to thereby irradiate the original and the photo-sensitive substance with the collected light respectively; a guiding device for guiding the collected light to the original and the photo-sensitive substance respectively; a light detecting device for reading the image of the original by receiving a scattered light from the irradiated original for the each scanning line at a reading cycle, and outputting image information, which indicates the image of the original; a sub-scanning direction moving device for relatively moving the collected light with respect to the original and the photo-sensitive substance respectively in a sub-scanning direction, to thereby perform a sub-scanning operation in the sub-scanning direction; a memory device for storing the outputted image information for the each scanning line; a light recording device for recording the latent image onto the photo-sensitive substance for the each scanning line at a recording cycle by reading out the stored image information from the memory device and driving the light source device to emit the light on the basis of the read out image information; and a magnification control device for relatively varying the reading cycle and the recording cycle with respect to each other.

According to the copier of the present invention, the light for reading the image of the original included in the emitted light from the light source device is deflected by the deflecting device in the main scanning direction, is collected by the light collecting device, and is guided by the guiding device, to be incident to the original placed on the original base. Then, the scattered light from the irradiated original is received by the light detecting device, so that the image of the original is read by the light detecting device, for each scanning line at the reading cycle. Then, the image information is outputted from the light detecting device and is stored into the memory device for each scanning line at the reading cycle.

On the other hand, the stored image information is read out from the memory device, and the light source device is driven to emit the light, on the basis of the read out image information, by the light recording device. The light for recording the latent image included in the emitted light from the light source device is deflected by the deflecting device in the main scanning direction, is collected by the light collecting device, and is guided by the guiding device, to be incident to the photo-sensitive substance. In this manner, the latent image is recorded by the light recording device onto the photo-sensitive substance for each scanning line at the recording cycle.

Further, by the sub-scanning direction moving device, the collected light is relatively moved with respect to the original and the photo-sensitive substance respectively in the sub-scanning direction.

Accordingly, a two dimensional scanning operation is performed for reading the image of the original, and a two dimensional scanning operation is performed for recording the latent image onto the photo-sensitive substance. Therefore, if the reading cycle and the recording cycle are equal to each other, the scan width for reading the image of the original and the scan width for recording the latent image onto the photo-sensitive substance are also equal to each other, so that a copying operation with an equivalent magnification is performed. On the other hand, if the reading cycle and the recording cycle are relatively varied with respect to each other by the magnification control device, the scan width for reading the image of the original and the scan width for recording the latent image onto the photo-sensitive substance are different from each other, so that a copying operation with an enlargement or shrinkage is performed.

Consequently, it is possible to speedily perform the copying operation with the enlargement or shrinkage, while it is possible to reduce the cost of the copier since a frame memory is not necessary for the copying operation with the enlargement or shrinkage.

In one aspect of the copier of the present invention, the magnification control device relatively varies (i) an emitting cycle of the light emitted from the light source device to the original and (ii) an emitting cycle, based on the read out image information, of the light from the light source device to the photo-sensitive substance, with respect to each other.

According to this aspect, on one hand, if the emitting cycle of the light to the original is varied by the magnification control device, the image information outputted by the light detecting device and stored into the memory device is delayed or advanced in time as compared with the case for the equivalent magnification. Therefore, the scan width for reading the image of the original and the scan width for recording the latent image onto the photo-sensitive substance are different from each other, so that the copying operation with the enlargement or shrinkage is performed. On the other hand, if the emitting cycle of the light to the photo-sensitive substance is varied by the magnification control device, the image information read out from the memory device is delayed or advanced in time as compared with the case for the equivalent magnification. Therefore, the scan width for reading the image of the original and the scan width for recording the latent image onto the photo-sensitive substance are different from each other, so that the copying operation with the enlargement or shrinkage is performed.

In another aspect of a copier of the present invention, the magnification control device relatively varies (i) a storing cycle for storing the outputted image information into the memory device and (ii) a reading out cycle for reading out the stored image information from the memory device, with respect to each other.

According to this aspect, on one hand, if the storing cycle is varied by the magnification control device, the image information stored into the memory device is delayed or advanced in time as compared with the case for the equivalent magnification. Therefore, the scan width for reading the image of the original and the scan width for recording the latent image onto the photo-sensitive substance are different from each other, so that the copying operation with the enlargement or shrinkage is performed. On the other hand, if the reading out cycle is varied by the magnification control device, the image information read out from the memory device is delayed or advanced in time as compared with the case for the equivalent magnification. Therefore, the scan width for reading the image of the original and the scan width for recording the latent image onto the photo-sensitive substance are different from each other, so that the copying operation with the enlargement or shrinkage is performed.

In this aspect, the magnification control device may interpolate the outputted image information before being stored into the memory device when the reading out cycle is relatively longer than the storing cycle, and may thin out the outputted image information before being stored into the memory when the reading out cycle is relatively shorter than the storing cycle.

Thus, on one hand, if the reading out cycle is set longer than the storing cycle, the scan width for recording the latent image onto the photo-sensitive substance is longer than the scan width for reading the image of the original, so that the copying operation with the enlargement is performed. The number of recording pixels obtainable by the outputted image information runs short for such a longer main scanning line. Therefore, by the magnification control device, the outputted image information before being stored into the memory device is interpolated, so that the number of recording pixels are compensated. On the other hand, if the reading out cycle is set shorter than the storing cycle, the scan width for recording the latent image onto the photo-sensitive substance is shorter than the scan width for reading the image of the original, so that the copying operation with the shrinkage is performed. The number of recording pixels obtainable by the outputted image information is in excess for such a shorter main scanning line. Therefore, by the magnification control device, the outputted image information before being stored into the memory device is thinned out, so that the necessary memory capacity of the memory device is not increased.

Further in this case, a reading clock on the basis of which the light detecting device reads the image of the original may be constant, and a recording clock on the basis of which the light recording device records the latent image may be constant. Thus, even if each of the reading clock and the recording clock is constant, because of the interpolating and thinning-out operations by the magnification control device, the copying operation with the magnification or shrinkage can be speedily performed without the frame memory, while preventing the recorded latent image from being rough and restraining the unnecessary of the memory capacity of the memory device.

In another aspect of the copier of the present invention, the copier is further provided with a moving speed varying device for varying a moving speed of the sub-scanning direction moving device, in association with a relative change between the reading cycle and the recording cycle.

According to this aspect, along with the relative change between the reading cycle and the recording cycle, the moving speed of the sub-scanning direction moving device is changed. At this time, the moving speed of the sub-scanning direction moving device is varied by the moving speed varying device, in association with the relative change between the reading cycle and the recording cycle, so that it is possible to perform the copying operation with the magnification or shrinkage in which the magnification or shrinkage ratio in the main scanning direction is equal to that in the sub-scanning direction.

In another aspect of the copier of the present invention, the memory device comprises: a first memory for storing the image information, which is outputted by the light detecting device; and a second memory for storing the image information, which is transferred from the first memory and is to be read out by the light recording device.

According to this aspect, at first, the image information, which is outputted by the light detecting device, is stored into the first memory. Then, the image information is transferred from the first memory to the second memory, so that the image information is read out from the second memory by the light recording device. Accordingly, since the reading operation by the light detecting device and the recording operation by the light recording device can be simultaneously performed, so that the speedy copying operation is realized.

In another aspect of the copier of the present invention, a plurality of light detecting devices each comprising the light detecting device are arranged at the vicinity of a surface of the original base and at a plurality of positions along the main scanning direction.

According to this aspect, since the image of the original is read by a plurality of light detecting devices, the reading operation is accurately performed at a high accuracy, and the enlargement or shrinkage can be also accurately performed.

In another aspect of the copier of the present invention, the magnification control device is provided with a reading clock control circuit for varying a reading clock on the basis of which the light detecting device reads the image of the original while the recording cycle is constant.

According to this aspect, the reading clock is varied by the reading clock control circuit. Thus, the reading cycle can be varied just by changing the reading clock while it is not necessary to change the recording cycle. Therefore, the copying operation with the enlargement or shrinkage can be speedily performed by use of a relatively simple construction.

In another aspect of the copier of the present invention, the magnification control device is provide with a recording clock control circuit for varying a recording clock on the basis of which the light recording device records the latent image while the reading cycle is constant.

According to this aspect, the recording clock is varied by the recording clock control circuit. Thus, the recording cycle can be varied just by changing the recording clock while it is not necessary to change the reading cycle. Therefore, the copying operation with the enlargement or shrinkage can be speedily performed by use of a relatively simple construction.

In another aspect of the copier of the present invention, the light source device is provided with: a first light source for emitting the light to read the image of the original; a second light source for emitting the light to record the latent image; and a light synthesizing device for synthesizing the light emitted by the first light source and the light emitted by the second light source. And that, the guiding device is provided with a light separating device for separating the synthesized light into the light to the original and the light to the photo-sensitive substance.

According to this aspect, the light to read the image of the original is emitted by the first light source while the light to record the latent image is emitted by the second light source. Then, the light emitted by the first light source and the light emitted by the second light source are synthesized to each other by the light synthesizing device. Then, after the light is deflected by the deflecting device and is collected by the collecting device, the synthesized light is separated into the light to the original and the light to the photo-sensitive substance, by the light separating device. Such a separation as well as a synthesis of the light may be performed on the basis of a difference in the wavelength between the lights emitted by the first and second light sources. Thus, the deflecting device such as a polygon mirror or the like and the collecting device such as a condenser lens or the like can be commonly used for the light to read the image of the original and the light to record the latent image. Therefore, the copying operation with the enlargement or shrinkage can be speedily and accurately performed.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Next, preferred embodiments of the present invention will be explained with reference to the accompanied drawings.
(First Embodiment)

A first embodiment of the present invention is explained with reference to FIGS. 1 to 11.

Figure 1:
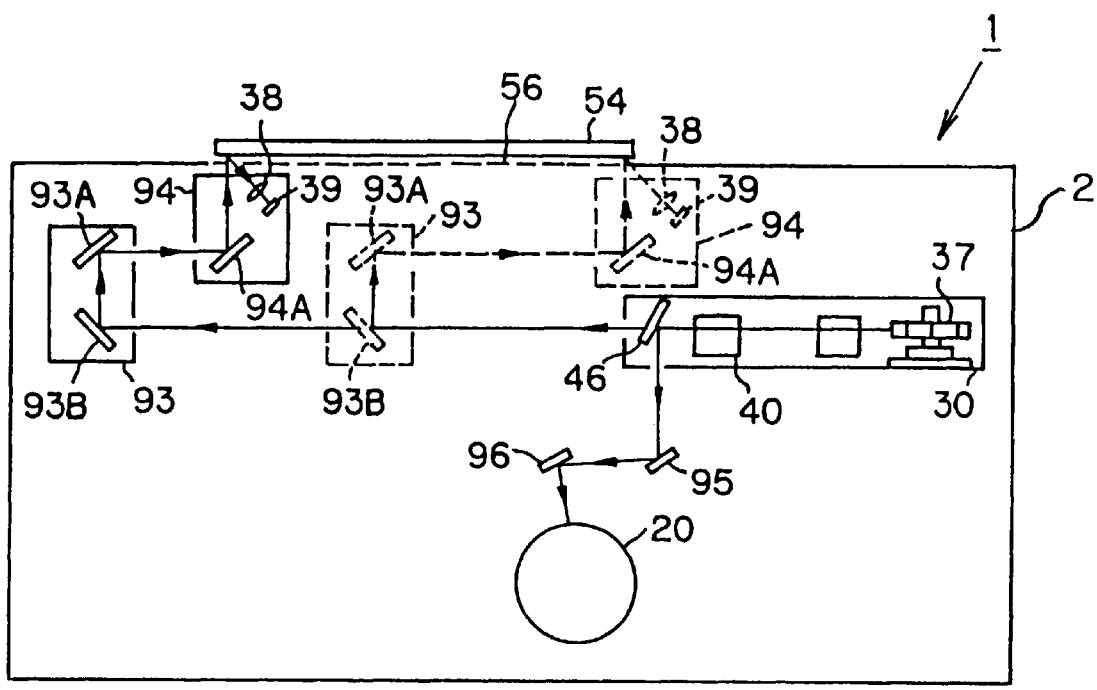
FIG. 1 is a schematic sectional view of a copier as a first embodiment of the present invention.

In FIG. 1, a laser copier 1 as one embodiment of the present invention is provided with: a main body case 2; a photo-sensitive drum 20 as one example of a photo-sensitive substance in which steps of charging, exposing, developing, transferring and the like are sequentially performed in order to produce an image; a laser scanner unit 30 for scanning and reading an original image and further producing an electrostatic latent image on the photo-sensitive drum 20; an original base 56 on which an original 54 is placed; and a half speed mirror 93 and a full speed mirror 94 for performing a scanning operation in a sub-scanning direction for the original 54 on the original base 56 by a reading light flux emitted from the laser scanner unit 30.

Incidentally, the laser copier 1 is further provided with: a developing device for visualizing the electrostatic latent image produced on the photo-sensitive drum 20; a feeder unit for feeding a paper P; a fixing unit for fixing on the paper P a transferred image, which has been transferred onto the paper P from the photo-sensitive drum 20; and the like (although they are not illustrated in the figure).

Next, respective components constituting the laser copier 1 are explained in detail, respectively.

The photo-sensitive drum 20 as one example of the photo-sensitive substance is composed of, for example, an organic photo-sensitive substance which mainly contains polycarbonate having positively chargeable characteristic. More actually, the photo-sensitive drum 20 is constituted by, for example, a hollow dram, in which a cylindrical sleeve made of aluminum is set as a main body and an optically conductive layer having a predetermined thickness (for example, approximately 20 μm) and comprising polycarbonate dissipated with optically conductive resin is formed around an outer circumference of the cylindrical sleeve. Moreover, the photo-sensitive drum 20 is rotatably supported on the main body case 2 in a condition where the cylindrical sleeve is grounded. That is, the laser copier 1 is constructed such that a positively charged toner is developed for the electrostatic latent image having a positive polarity (positive charges) formed on the photo-sensitive drum 20 by using an inversion development method. The photo-sensitive drum 20 is clockwise rotation-driven, when seen from a side, by using a driving device (not shown).

The laser scanner unit 30 is disposed above the photo-sensitive drum 20.

Figure 7:
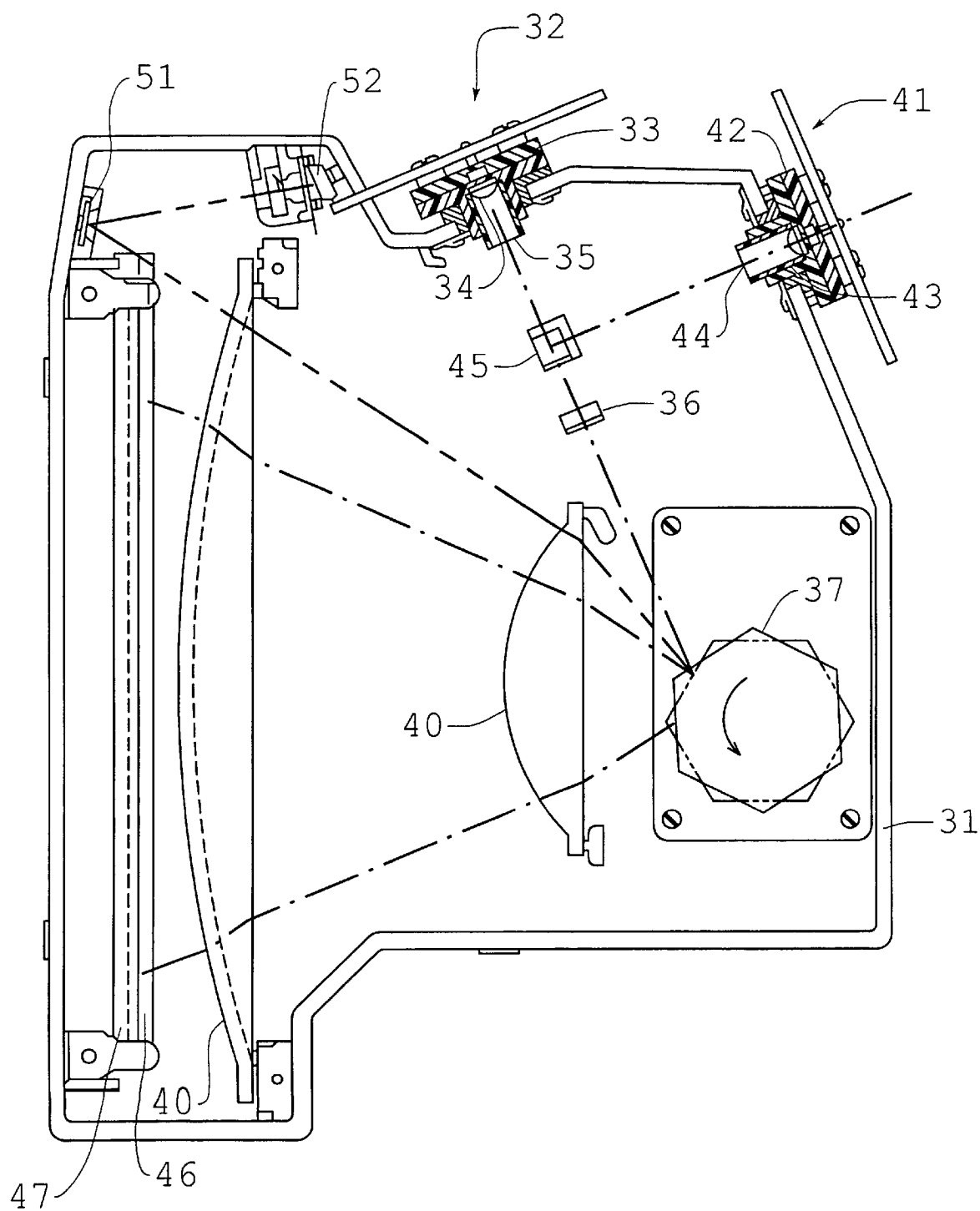
FIG. 7 is a schematic plan view of a laser scanner unit in the first embodiment.

As shown in FIG. 7, the laser scanner unit 30 includes a laser unit 32 in which a semiconductor laser 33 servicing as one example of a light source used to record an image, a collimator lens 34 for making a light flux emitted by the semiconductor laser 33 approximately parallel and a stop (i.e. a diaphragm) 35 for narrowing a spot diameter of the parallel light flux to a predetermined diameter are integrated within a scanner frame 31. Moreover, a cylindrical lens 36 having a function of converging only in one direction is mounted on an optical path of the light flux emitted by the semiconductor lens 33. A polygon mirror 37, which has a regularly hexagonal shape and services as one example of a deflecting device, is disposed at a focal point of the cylindrical lens 36 so as to be rotated at a constant angular speed with a center of the regular hexagon as an rotational axis. The light flux reflected on a reflection surface of the polygon mirror 37 is scanned at a uniform angular velocity in a main scanning direction.

A condenser lens 40 servicing as one example of a light collecting device for collecting the light flux onto the photo-sensitive drum 20 is mounted on the optical path of the light flux reflected by the polygon mirror 37. The condenser lens 40 is provided with two lens, collects the deflection-scanned light flux onto the photo-sensitive drum 20 so as to be irradiated at a minute spot thereon, and has an fθ function of converting the light flux to be defection-scanned at a constant angular velocity by the polygon mirror 37 into a light flux to be linearly scanned at a constant linear speed on the photo-sensitive drum 20.

On the other hand, a laser unit 41 in which a semiconductor laser 42 servicing as one example of a light source used to read an image, a collimator lens 43 for making a light flux emitted by the semiconductor laser 42 approximately parallel and a stop (i.e. a diaphragm) 44 for narrowing a spot diameter of the parallel light flux to a predetermined diameter are integrated is disposed in another portion of the scanner frame 31. A dichroic mirror 45 servicing as one example of an optical path synthesizing device is disposed at a point where the light flux emitted by the reading semiconductor laser 42 and the light flux emitted by the recording semiconductor laser 33 cross each other.

This dichroic mirror 45 has a function of transmitting a light flux of a wave length which the semiconductor laser 33 has and further reflecting a light flux of a wave length which the semiconductor laser 42 has. An angle between the light flux emitted by the semiconductor laser 33 and the light flux emitted by the semiconductor laser 42 is 90° under the above mentioned condition. Hence, by inputting the light flux emitted by the semiconductor laser 42 at an incident angle of 45° with respect to the dichroic mirror 45, both of the light fluxes of the lasers after passing through the dichroic mirror 45 are synthesized to pass on the same optical path.

Figure 8:
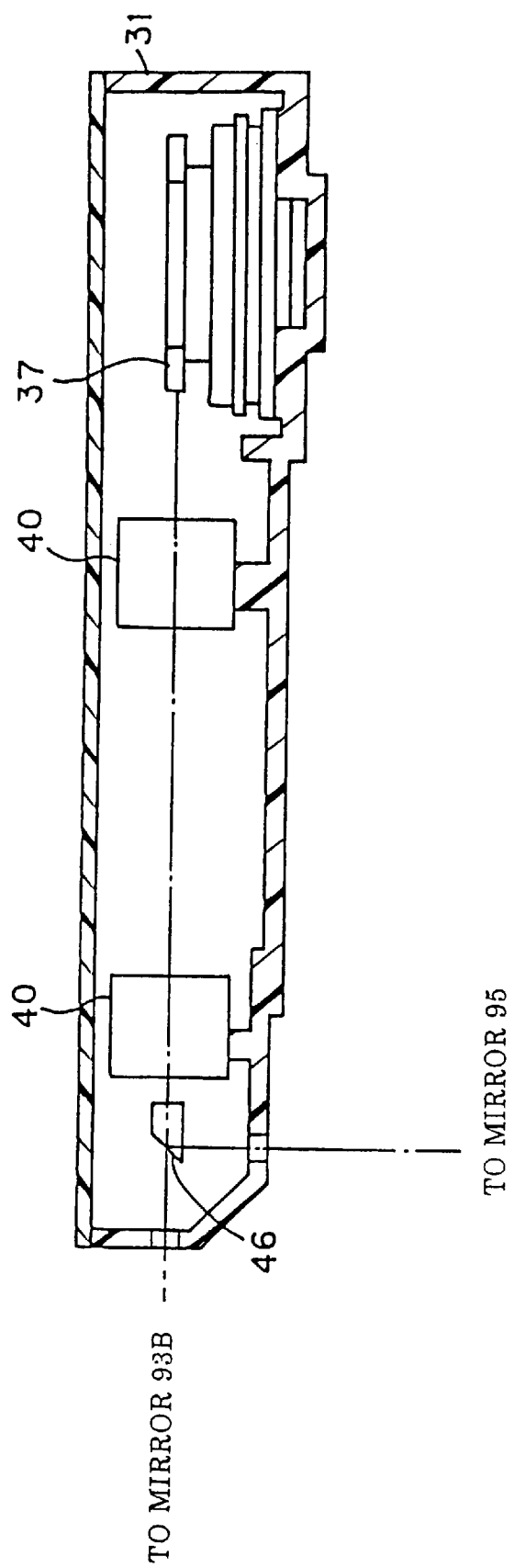
FIG. 8 is a schematic sectional view of the laser scanner unit in the first embodiment.

A dichroic mirror 46, which has a function similar to that of the dichroic mirror 45 and services as one example of a guiding device to an original side, is disposed between the condenser lens 40 and the photo-sensitive drum 20, as shown in FIGS. 7 and 8. A light flux, which is emitted by the recording semiconductor laser 33 and reflected by the dichroic mirror 46, is reflected in a direction (below the laser scanner unit 30 in FIG. 1) of the photo-sensitive drum 20, and thereby the light flux is guided to the photo-sensitive drum 20. On the other hand, the light flux emitted by the reading semiconductor laser 42 is transmitted by the dichroic mirror 46, and reaches a side of the half speed mirror 93 described later.

A BD mirror 51 for reflecting the recording light flux emitted by the semiconductor laser 33 and a BD sensor 52 for detecting the light flux reflected by the BD mirror 51 and then generating a horizontal synchronization signal are disposed at a position outside of an irradiation range to the photo-sensitive drum 20 within the scanner frame 31.

In FIG. 1 again, the half speed mirror 93 and the full speed mirror 94, which service as one example of a sub-scanning direction moving device that can be reciprocated with respect to the sub-scanning direction, are disposed on the forward side of the radiation direction of the reading light flux from the above mentioned laser scanner unit 30.

The full speed mirror 94 waits at a position shown by a solid line in FIG. 1 when starting the scanning operation in the sub-scanning direction, and stops at a position shown by a dashed line in FIG. 1 after ending the scanning operation in the sub-scanning direction. The full speed mirror 94 includes a mirror 94A for actually reflecting the reading light flux, light detectors 39 for receiving the reflection lights of the reading light fluxes from the original 54 to thereby output a light detection signal, and light detecting lenses 38 for collecting the reflection lights onto the light detectors 39.

Figure 9:
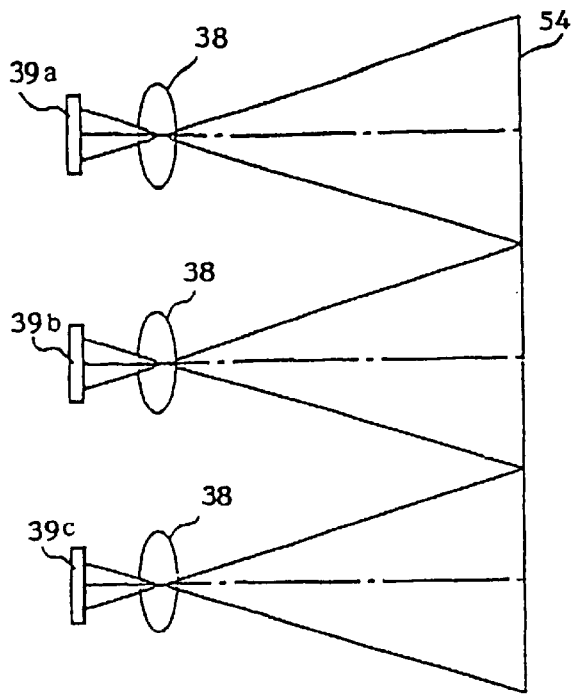
FIG. 9 is a diagram showing an aspect of a detection of a light flux reflected by an original in the first embodiment.

As shown in FIG. 9, three sets, each containing the light detecting lens 38 for detecting the light flux scattered and reflected by the original 54 and the light detector 39 (39a, 39b, 39c) servicing as one example of the light detecting device composed of photo-diodes that are the known photoelectric converting elements, are arranged in a direction in parallel to the scanning direction of the light flux at an equivalent or uniform interval. Incidentally, the number of the light detectors 39 is not limited to 3. It can have an additional number of the light detectors 39 (for example, 7). If so, it is possible to reduce the irregularity of the sensitivity of the light detector 39.

On the other hand, the half speed mirror 93 waits at a position shown by a solid line in FIG. 1 when starting the scanning operation in the sub-scanning direction, and stops at a position shown by a dashed line in FIG. 1 after ending the scanning operation in the sub-scanning direction. The half speed mirror 93 includes mirrors 93A and 93B for actually reflecting the reading light flux.

The moving speed of the full speed mirror 94 and the moving speed of the half speed mirror 93 are controlled by a driving device (not shown) such that a ratio of the moving speed of the full speed mirror 94 to that of the half speed mirror 93 in the sub-scanning direction in the scanning operation is two to one (at this time, a ratio of a moving distance of the full speed mirror 94 to a moving distance of the half speed mirror 93 is also two to one). A length of the optical path of the reading light flux between the condenser lens 40 and the original 54 is maintained constant during scanning in the sub-scanning direction by the operations of the full speed mirror 94 and the half speed mirror 93. Hence, the reading light flux is always correctly collected on the original 54.

Moreover, mirrors 95 and 96 servicing as one example of a guiding device for guiding the recording light flux onto the photo-sensitive drum 20 are disposed on an optical path of the recording light flux emitted by the laser scanner unit 30. Positions of the mirrors 95 and 96 are set such that the length of the optical path from the condenser lens 40 to the original 54 is equal to a length of the optical path from the condenser lens 40 to the photo-sensitive drum 20.

As a result, an accuracy when recording the original is equal to an accuracy when reading the image. Hence, the image on the original 54 can be accurately reproduced on the photo-sensitive drum 20. That is, the light flux irradiated to the original 54 is the light flux which is emitted by the semiconductor laser 42 and reflected by the dichroic mirror 46. The light flux emitted by the semiconductor laser 33 and the light flux emitted by the semiconductor laser 42 are synthesized by the dichroic mirror 45 to pass on the same optical path and then are separated by the dichroic mirror 46. Hence, only the light flux emitted by the semiconductor laser 33 is irradiated to the photo-sensitive drum 20, and only the light flux emitted by the semiconductor laser 42 is irradiated to the original 54.

This embodiment can perform enlarging and shrinking copy operations by varying a reading clock in the above mentioned laser copier 1. Next, means for varying the reading clock in this embodiment is explained.

Figure 2:
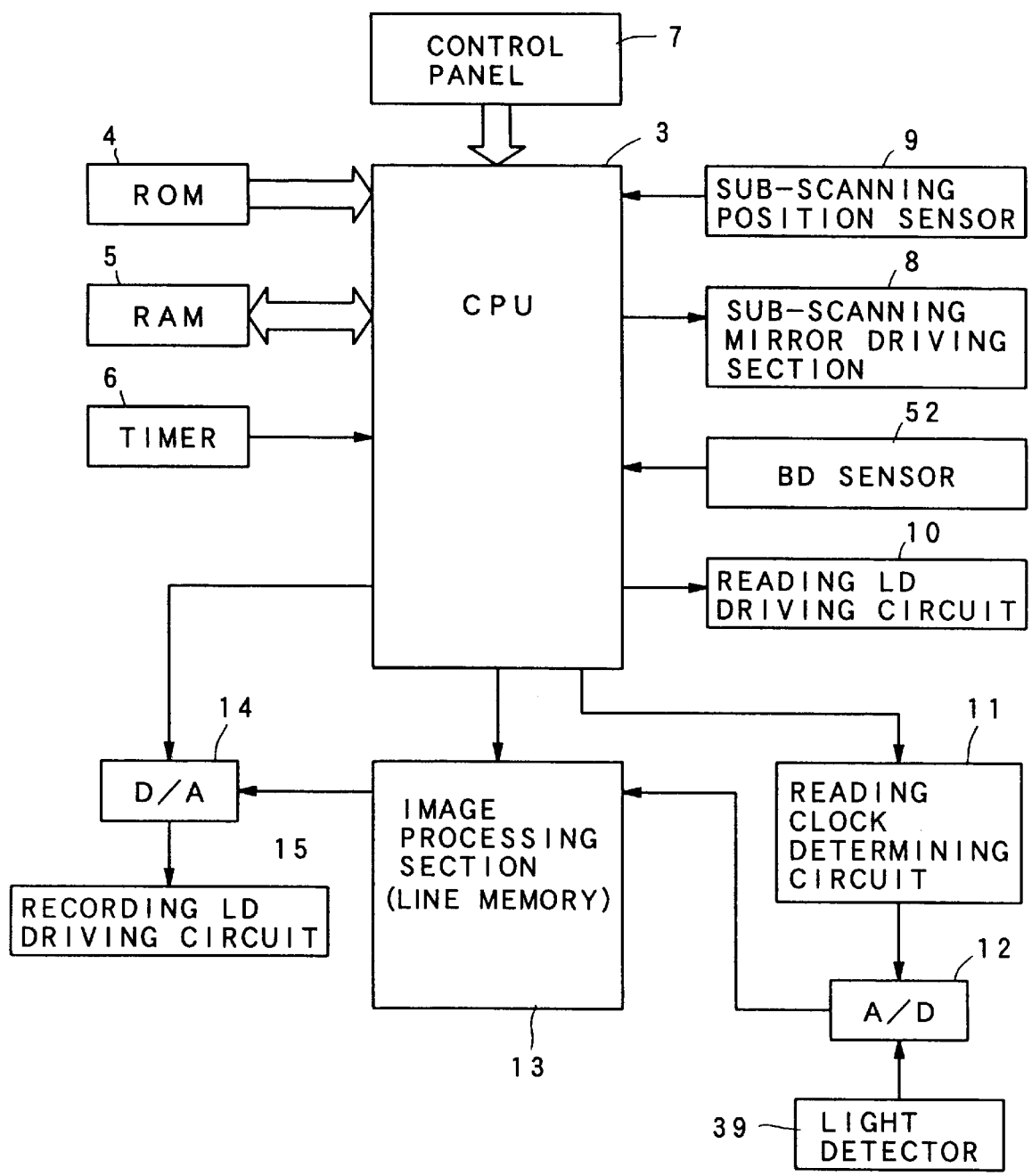
FIG. 2 is a schematic block diagram of a control section of the copier in the first embodiment.

FIG. 2 is a block diagram showing a schematic configuration of a control section of the laser scanner unit 30 in this embodiment.

In FIG. 2, a ROM 4 in which a program, table data and the like are stored, a RAM 5 used for a work area for an algorithm process and the like and a timer 6 for measuring a start timing or a stop timing of a scanning time in the main scanning direction are connected to a CPU 3 servicing as one example of a magnification control device. A scanning control described below is performed in accordance with a control program stored in the ROM 4.

A control panel 7 mounted on an upper portion of the main body case 2 is also connected to the CPU 3. Then, a signal to start a copy operation and set information as for an image ratio, such as an enlargement, a shrinkage, an equivalent magnification or the like, are sent from the control panel 7 to the CPU 3.

Moreover, a sub-scanning mirror driving section 8 composed of the half speed mirror 93 and the full speed mirror 94, and a sub-scanning position sensor 9 for detecting a sub-scanning position of the sub-scanning mirror are connected to the CPU 3. The sub-scanning position sensor 9 is disposed at a predetermined position (not shown in FIG. 1) within the main body case 2, in order to detect that the sub-scanning mirror is located at a start position or a stop position of the sub-scanning operation. The CPU 3 controls the start and the stop of the scanning operation of the sub-scanning mirror by sending a signal to the sub-scanning mirror driving section 8, on the basis of the signal from the sub-scanning position sensor 9.

In order to control the scanning operation in the main scanning direction, the BD sensor 52 is connected to the CPU 3, and further a reading LD driving circuit 10 for driving the reading semiconductor laser 42 is also connected to the CPU 3. Then, the CPU 3 sends a signal to the reading LD driving circuit 10 to thereby control the emitting operation of the semiconductor laser 42, the rotating operation of the polygon mirror 37 and the like. When a trigger signal is inputted from the BD sensor 52, the emitting operation from the semiconductor laser 42 to the polygon mirror 37 is started after an elapse of a predetermined time from the input timing of the trigger signal, and then the scanning operation in the main scanning direction is started.

The reading operation in this main scanning direction is performed on the basis of a predetermined reading clock, which can be varied by means of a reading clock determining circuit 11, in this embodiment. A standard clock having a predetermined short period or cycle (i.e. a predetermined high frequency) is inputted from an oscillator (not shown) to the reading clock determining circuit 11. The reading clock determining circuit 11 is a circuit for dividing this standard clock based on a signal from the CPU 3.

The reading clock that is determined and outputted by the reading clock determining circuit 11 is inputted to an A/D converter 12, which adds the light reception signals from the three light detectors 39 to each other on the basis of the reading clock, and then performs an A/D conversion of the added result to thereby output it to an image processing section (line memory) 13 servicing as one example of a memory device. The reason why the light detection signals are added to each other is described below. That is, when an irradiation position on the original of the light beam is located on a front side of the photo diode, the amount of the reflection light received by the photo diode is the largest amount, and as the irradiation position becomes more distant from the front side of the photo diode, the amount of the reflection light becomes small. For example, when the irradiation position is located on a front side of the photo diode 39a (as shown in FIG. 9), the light amount received by the photo diode 39a is the largest amount. When the irradiation position is located at a middle position between the photo diode 39a and the photo diode 39b, the light amount received by the photo diode 39a is smaller than that when located on the front side, and is substantially equal to the light amount received by the photo diode 39b. Hence, if summing up the light amounts received by both of these diodes, even though the irradiation position is moved to the main scanning direction, a variation of the received light amount becomes small. Accordingly, a reading accuracy is uniform over a main scanning area. This results in an extremely cheap cost, as compared with a case where a line sensor, such as a CCD or the like, is used.

On the other hand, the CPU 3 manages the irradiation position as an elapsed time from a timing when the light beam is inputted to the BD sensor 52. For example, assuming that the irradiation position is an end point P1 along the main scanning direction of the original when a time T1 has elapsed, when a time (T1+Δt, wherein the Δt is a time of the reading clock) has elapsed, the irradiation position becomes one adjacent point P2 on a side of the main scanning direction of the end point P1. When a time (T1+2Δt) has elapsed, the irradiation position becomes a further adjacent point P3. The CPU 3 reads the synthesized value for each reading clock, and then compares a value (synthesized value) of a total amount of the reflection lights from the irradiation position at that time with the predetermined reference value. If the synthesized value is larger than the reference value, it is judged as white. If the synthesized value is smaller, it is judged as black. In case of detecting a half tone, values of a white level and a black level are stored in advance, so that a gradation (concentration value) is calculated on the basis of a position between the white level and the black level in the synthesized value. The white/black levels and the gradation data (hereinbelow, it is referred to as "pixel data") which are calculated in this manner are stored into the RAM 5 for each irradiation position. Hence, the irradiation position is changed for each clock, and the pixel data is stored for each irradiation position. Incidentally, the completion of the main scanning operation is also judged from the elapsed time. This is determined by a width of the scanning area and a rotational speed of the polygon mirror 37. An operation that the irradiation position is changed in the sub-scanning direction by a predetermined amount after the reading operation is performed by the main scanning operation of one line is repeated, and the reading operation is again performed by the main scanning operation of the one line, and then a two-dimensional scanning operation of the original is completed.

The image processing section (line memory) 13 is also connected to the CPU 3, and inputting and outputting of the data are controlled by a signal from the CPU 3. An output signal from the image processing section 13 is inputted to a D/A converter 14. An output signal from the D/A converter 14 is inputted to a recording LD driving circuit 15 to drive the recording semiconductor laser 33. Then, the CPU 3 sends a drive signal to the D/A converter 15 at a predetermined timing to thereby control the recording semiconductor laser 33 through the recording LD driving circuit 15.

Figure 3:
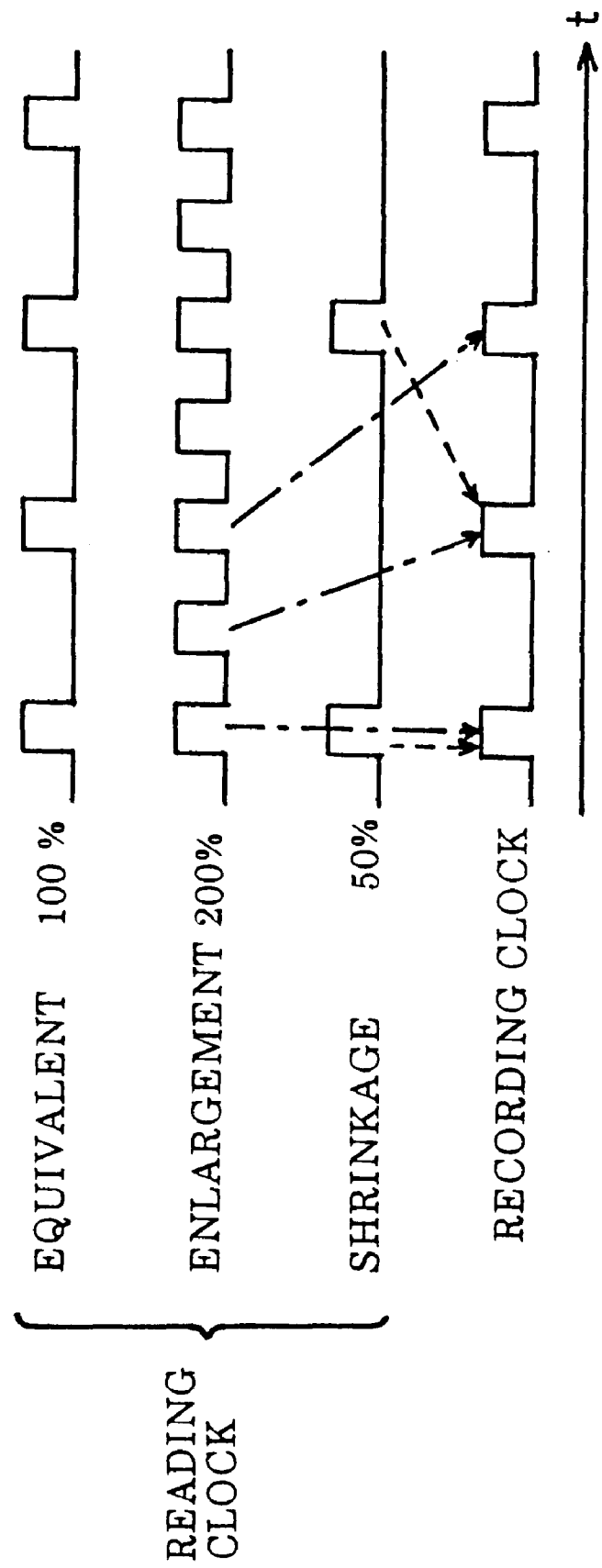
FIG. 3 is a timing chart for explaining a principle of enlarging and shrinking operations in the first embodiment.

In this embodiment, since the control section has the above mentioned configuration, it varies the reading clock, and maintains the recording clock constant to thereby implement the enlargement and the shrinkage. FIG. 3 is a timing chart to explain this principle. If the frequency of the reading clock is identical to that of the recording clock as shown in FIG. 3, a copy is performed at an equivalent magnification. However, if the frequency of the reading clock is changed into two times, a read width in the main scanning direction within a recording time relative to one scanning line with respect to the main scanning direction becomes half of that in the case of the equivalent magnification as shown in FIG. 3, when the recording clock is constant. Hence, an enlargement image of 200% is recorded. On the other hand, if the frequency of the reading clock is changed into ½ times, the read width in the main scanning direction within the recording time relative to the one scanning line with respect to the main scanning direction becomes two times of that in the case of the equivalent magnification as shown in FIG. 3, when the recording clock is constant. Hence, the shrinkage image of 50% is recorded.

Next, an operation of the laser copier 1 having the above mentioned configuration is explained with reference to FIGS. 1 to 10. Incidentally, reference numbers at steps S1 to S17 used in the following explanations correspond to those at respective steps shown in a flow chart in FIG.4.

At first, a case is explained in which a copy is performed at an equivalent magnification. When the original 54 is placed on a glass of the original base 56 and then a press cover (not shown) is closed, the original 54 is set on a predetermined position of the glass. Next, when a magnification specifying key and a copy start key are pushed down on the control panel 7 (not shown in FIG.1) equipped on a top surface of the main body case 2, the magnification specifying signal and the copy start signal are inputted from the control panel 7 to the CPU 3.

Based on the magnification specifying signal, the CPU 3 selects a copy magnification (Step S1), determines a sub-scan reading speed (Step S2) and determines the reading clock (Step S3). If the equivalent magnification is specified, a clock identical to the recording clock is selected.

Then, it is checked by the sub-scanning position sensor 9 that the half speed mirror 93 and the full speed mirror 94 already come back to a scanning start position (Step S4; YES). If the trigger signal is inputted from the BD sensor 52 (Step S5; YES), a reading operation of an image is started after an elapse of a predetermined time measured by the timer 6 from that input timing of the trigger signal.

The trigger signal from the BD sensor 52 is obtained, as shown in FIG. 7, by reflecting on the BD mirror 51 the light flux shown by chain double-dashed lines before an image area 47 shown by dashed lines, among the light fluxes to be deflection-scanned, in conjunction with the rotation of the polygon mirror 37, to thereby input the light flux to the BD sensor 52.

The reading operation of the image is performed by outputting a signal from the CPU 3 to the sub-scanning mirror driving section 8 to thereby move the full speed mirror 94 at the sub-scan reading speed determined as mentioned above and then move the half speed mirror 93 at a speed of ½ times of the sub-scan reading speed. The scanning operation in the main scanning direction is started by also outputting a signal to the reading LD driving circuit 10 to thereby drive the reading semiconductor laser 42 at a predetermined cycle and then deflect the reading light flux by the polygon mirror 37.

Accordingly, the reading light flux with a directivity is emitted by the semiconductor laser 42, which is disposed in the laser scanner unit 30 and services as one example of the light source for the image reading operation. Then, the reading light flux is made substantially parallel through the collimator lens 43, is set to the predetermined diameter by the stop 44 and is inputted to the dichroic mirror 45. Then, the dichroic mirror 45 reflects the reading light flux, and synthesizes this reading light flux and the recording light flux emitted by the semiconductor laser 33, on the same optical path. After that, the reading light flux is reflected and deflected by the polygon mirror 37 similarly to the recording light flux, and is then inputted to the dichroic mirror 46, is transmitted by the dichroic mirror 46, is reflected by the reflection mirrors 93B, 93A and 94A and is finally irradiated toward the original 54 on the original base 56.

In conjunction with the rotation of the polygon mirror 37, the reading light flux scans the original 54 in a one-dimensional manner, and further the reading light flux raster-scans the original 54 by the scanning operation in the sub-scanning direction by means of the half speed mirror 93 and the full speed mirror 94. Accordingly, the scanning operation is performed in a two-dimensional manner. The light flux irradiated to the original 54 as mentioned above is scatter-reflected by the original 54, is collected onto the light detector 39 by the light detecting lens 38, is received by the light detector 39 (Step S6), and is then outputted to the A/D converter 12 as the light reception signal (Step S7).

In order to output the reading clock determined as mentioned above, the CPU 3 outputs a division signal to the reading clock determining circuit 11. In this case, the CPU 3 outputs the division signal so as to output the reading clock identical to the recording clock. Moreover, the CPU 3 controls the image processing section (line memory) 13 so as to write data into the image processing section (line memory) 13. Accordingly, the image information to which the A/D conversion has been applied by the A/D converter 12 is accumulated in the image processing section (line memory) 13 (Step S8), and is read out when the recording operation is performed as described later.

The inputting process of the signal from the light detector 39 and the writing process of the data to the image processing section (line memory) 13 (Steps S6 to S8) as mentioned above are continued until the main scanning time measured by the timer 6 is ended (Step S9).

When the main scanning time is ended (Step S9; YES), in order to perform a next main reading operation, the writing steps of the data to the image processing section (line memory) 13 from the start of the main scan reading operation (Steps S5 to S8) are continued until it is detected by the sub-scanning position sensor 9 that the sub-scanning mirror reaches the end position of the sub-scan reading operation (Step S10). If it is detected by the sub-scanning position sensor 9 that the sub-scanning mirror reaches the end position of the sub-scan reading operation (Step S10; YES), all the reading steps are ended.

Incidentally, if the image produced on the original 54 is written with ink or dye, it is recognized as black by an eye of a human. However, if infrared light is irradiated, there may be a case that a portion of the image is also reflected and thereby it is detected as white. That is, it is desirable that the original 54 is read by visible light. Hence, it is required that the semiconductor laser 42 servicing as one example of the light source for the reading operation has a wave length ranging from 400 nm to 700 nm. On the other hand, it is not needed that the semiconductor laser 33 servicing as one example of the light source for the recording operation emits the visible light. Thus, it is preferable to use a wave length of 780 nm such as near infrared light for the semiconductor laser 33, from the viewpoint of a spectral sensitivity and a cost of the typical photo-sensitive drum 20.

FIG. 9 is a plan view showing a positional relation between the light detectors 39a to 39c and the light detecting lenses 38 arranged in a direction parallel to the scanning direction.

The three light detecting lenses 38 and the three light detectors 39a to 39c are arranged so as to equivalently or uniformly divide an image reading width of the original 54. The original 54 and each of the light detectors 39a to 39c are optically conjugate to each other with respect to respective one of the light detecting lens 38. Then, an image formation magnification of the light detecting lens 38 is determined on the basis of a size of the light detector 39. For example, if scanning a width (e.g., 210 mm) on a shorter side of an original 54 with an A4 size and then detecting the light flux reflected from the original 54 by using the three light detectors 39a to 39c, a width detected by one light detector 39 is 70 mm. Thus, assuming a width of one light detector 39 to be 5 mm, the image formation magnification may be 1/14. The signals from the respective light detectors 39a to 39c arranged as mentioned above are added to each other. Hence, it is possible to read the two-dimensional image of the original 54 as a time series signal by detecting the light flux, in which the amount of the reflected light is varied on the basis of the image of the original 54.

In FIG. 4 again, at a timing when the main scanning time is ended, the recording operation is also started (Steps S9: YES to S11). This recording operation is started after an elapse of a predetermined time from the inputting operation of the BD signal so as to align a start position of a next main scan reading operation (Step S11).

When the recording operation is started (Step S11: YES), the stored data is read out from the image processing section (line memory) 13 at a constant recording clock (Step S12). The D/A conversion is performed by the D/A converter 14 (Step S13). The semiconductor laser 33 is modulated by the recording LD driving circuit 15 on the basis of the D/A converted data (Step S14). The light flux, which has the directivity and is emitted by the semiconductor laser 33 on the basis of the modulated signal, is made substantially parallel through the collimator lens 34. The light flux narrowed to the determined diameter by the stop 35 transmits through the dichroic mirror 45, then passes through the cylindrical lens 36 having the converging function only in one direction, and inputs as a line image to the polygon mirror 37 servicing as one example of a deflector. Moreover, the light flux is reflected and deflected toward the condenser lens 40 by the polygon mirror 37, is reflected downward in FIGS. 1 and 8 by the dichroic mirror 46, is inputted to the mirrors 95 and 96, is further reflected by the mirrors 95 and 96, and is then irradiated onto a surface of the photo-sensitive drum 20. So, the irradiated light flux exposes the photo-sensitive drum 20 rotating with a center thereof as a rotation axis. In this embodiment, the photo-sensitive drum 20 and a driving mechanism of the photo-sensitive drum 20 constitute one example of the sub-scanning direction moving device on the side of the photo-sensitive substance.

Figure 10:
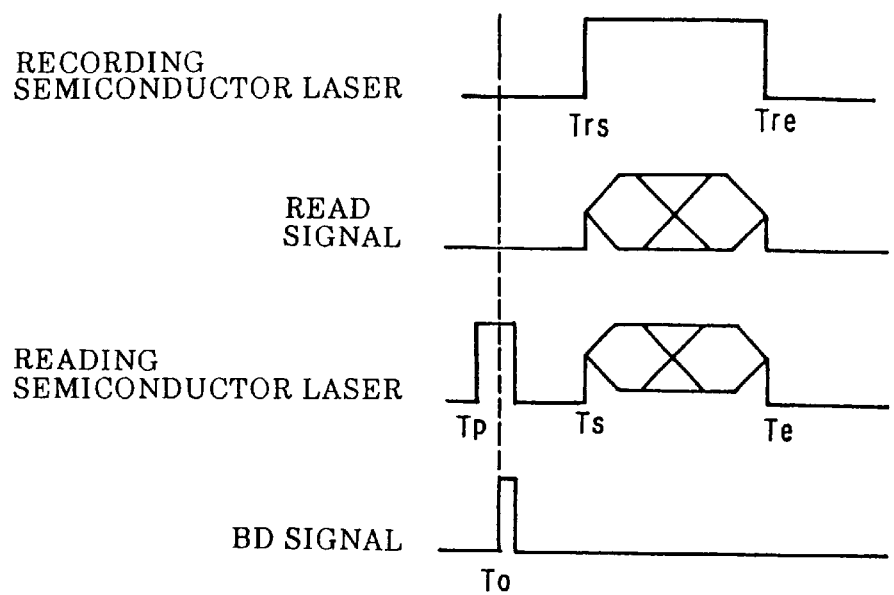
FIG. 10 is a timing chart of the reading and recording operations of the laser scanner unit in the first embodiment.

FIG. 10 is a timing chart showing operational timings of the reading semiconductor laser 42 and the recording semiconductor laser 33.

The recording semiconductor laser 33 is turned on at a time Tp before the light flux is inputted to the BD sensor 52. At that time, the reading semiconductor laser 42 is turned off in order to make a timing accuracy higher. When in conjunction with the rotation of the polygon mirror 37, the light flux emitted by the recording semiconductor laser 33 is inputted to the BD sensor 52 and the BD signal is detected, a standard time To relative to one scanning operation is set. Then, the recording semiconductor laser 33 is once turned off. After it is turned off, the reading semiconductor laser 42 is turned on at a time Trs after an elapse of a certain time. At a time Ts after a similar elapse of a certain time, the recording semiconductor laser 33 is modulation-driven on the basis of the image signal detected by the light detector 39. Now, a relation between the times Trs and Ts implies a time including a delay from a time point when the read signal obtained by the light detector 39 is inputted to the image processing section 13 to a time point when the recording semiconductor laser 33 is modulated. After that, the reading semiconductor laser 42 and the recording semiconductor laser 33 are respectively turned off at times Tre and Te corresponding to the scanning operations for the image area (for example, 210 mm that is a width on a shorter side in an A4 size). Then, this operation is repeated each time the scanning operation is performed.

In FIG. 4 again, the above mentioned recording operations are performed until the line data is ended (Step S15). If the line data is ended (Step S15; YES), the main scan recording operation is ended (Step S16). The above mentioned recording steps are performed until the sub-scanning direction recording operation is ended (Step S17; NO). If the sub-scan recording operation is ended (Step S17; YES), all the recording steps are ended. Incidentally, the detection of the complement of the sub-scan recording operation may be judged from a fact that the sub-scan reading operation is ended and then the reading operation for a final scanning operation is recorded.

Prior to the above mentioned irradiation of the recording semiconductor laser 33, residual charges on the surface of the photo-sensitive drum 20 to be rotation-driven are perfectly removed by a discharging lamp (not shown). After that, the surface of the photo-sensitive drum 20 is uniformly charged to a predetermined potential by a positive charger (not shown). Under that condition, the laser light emitted as mentioned above reaches the photo-sensitive drum 20. Accordingly, an electrostatic latent image having a width of an A4 size is produced on the photo-sensitive drum 20, and developed by a developing device (not shown). Moreover, a paper is fed in time to the developing step. After the developed image is transferred onto the fed paper by a transferring charger (not shown), it is fixed by a fixing unit (not shown) and is then ejected to a paper ejection tray (not shown). Then, the copy steps are ended.

Figure 5A:
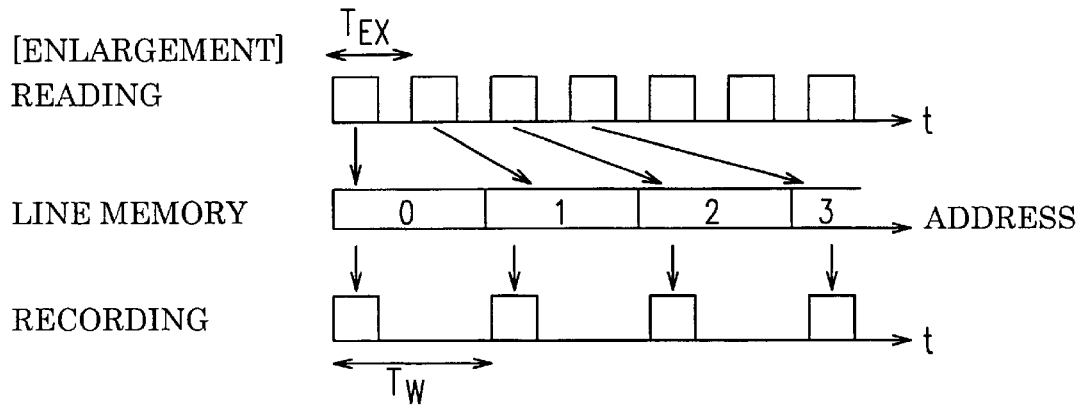
FIGS. 5(A), 5(B) and 5(C) are timing charts of the enlarging and shrinking operations in the first embodiment.
Figure 5B:
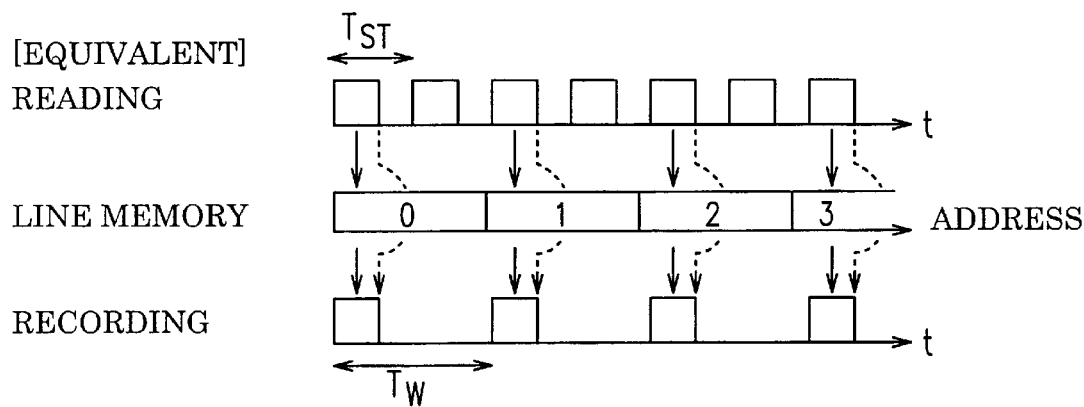

In case of the equivalent magnification, an image reading period (i.e. an image reading cycle) $T_{ST}$ is equally set to a recording period (i.e. a recording cycle) Tw, by performing the above mentioned control, as shown in FIG. 5(B). Hence, the width of the main scan reading operation within the main scan recording time becomes a standard A4 size. Thus, the image having the equivalent magnification is produced.

Figure 4:
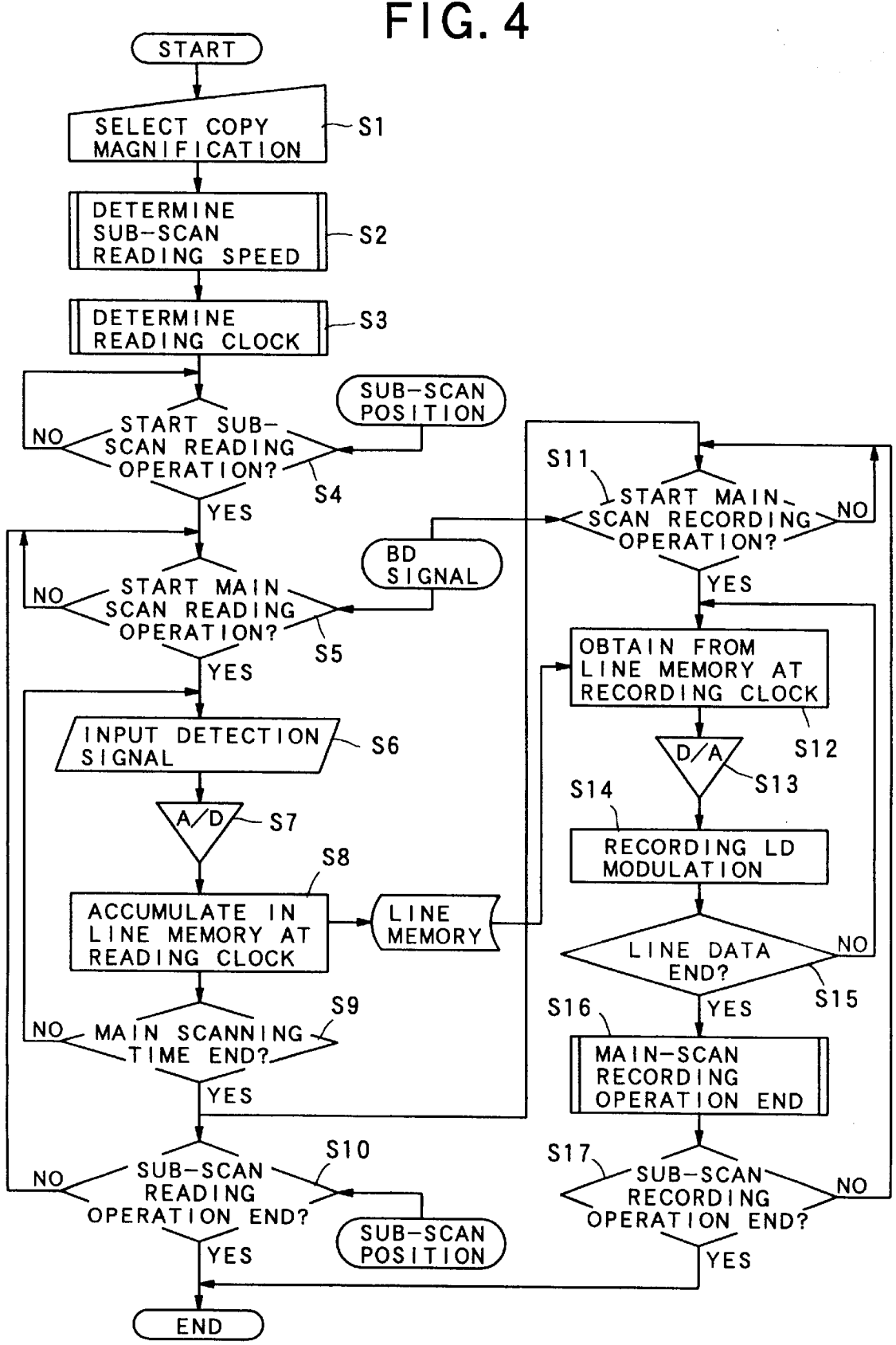
FIG. 4 is a flow chart showing an image reading and recording operations in the first embodiment.

Next, a case is explained in which an enlargement copy is performed with reference to FIG. 4. When an enlargement magnification is specified on the control panel 7 and then the copy start key is pushed down, the CPU 3 selects the copy magnification on the basis of this magnification specifying signal (Step S1), determines the sub-scan reading speed (Step S2) and determines the reading clock (Step S3).

For example, if the enlargement magnification of 200% is specified, the sub-scan reading speed is set to half of that in the case of the equivalent magnification copy, and a period (i.e. a cycle) of the reading clock is set to $T_{EX}$ which is half of a period (i.e. a cycle) Tw of the recording clock, as shown in FIG. 5(A).

After that, in FIG. 4 again, similarly to the case of the equivalent magnification, the sub-scan reading operation is started (Step S4; YES), and the main scan reading operation is started (Step S5; YES). Moreover, similarly to the case of the equivalent magnification, the inputting process of the signal from the light detector 39 and the writing process of the data to the image processing section (line memory) 13 (Steps S6 to S8) are continued until the main scanning time is ended (Step S9). However, at that time, the data accumulated in the image processing section (line memory) 13 is the data delayed in view of a time, as compared with the case of the equivalent magnification, as shown in FIG. 5(A). A scan width in the main scanning direction read until the main scanning time is ended (Step S9; YES) becomes half of that in the case of the equivalent magnification.

However, since the recording clock is constant similarly to the case of the equivalent magnification, the record width from the start of the main scan recording operation to the completion of the line data (Steps S11 to S15) is similar to the case of the equivalent magnification, as shown in FIG. 5(A). Hence, since the image information having the scan width which is half of that in the case of the equivalent magnification is recorded at the same width as the case of the equivalent magnification, the image is finally enlarged to two times and recorded.

Figure 6A:
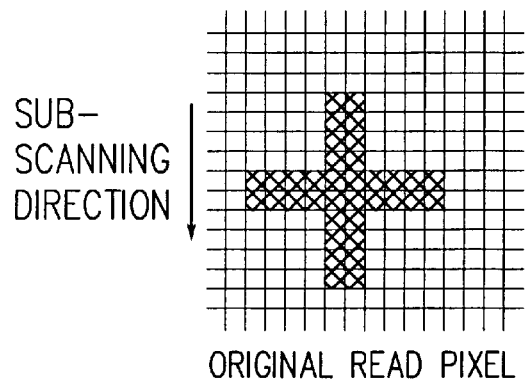
FIGS. 6(A), 6(B), 6(C) and 6(D) are plan views of images respectively in case of performing the enlarging and shrinking operations in the first embodiment.
Figure 6B:
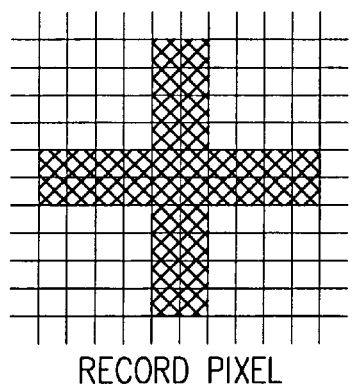
Figure 6C:
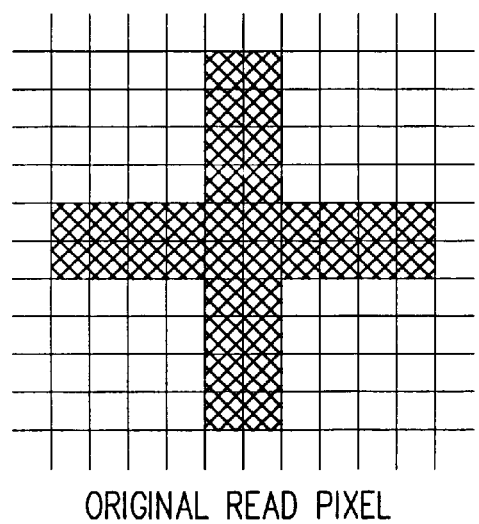

FIG. 6(B) shows a record pixel when the enlarging process is performed as mentioned above. The example shown in FIG. 6(B) does not imply the case when the enlargement of 200% is performed as mentioned above. However, it is understood that the record width in the example is enlarged and it is larger than that of the read pixel shown in FIG. 6(A).

Next, a case is explained in which a shrinkage copy is performed with reference to FIG. 4. When a shrinkage magnification is specified on the control panel 7 and then the copy start key is pushed down, the CPU 3 selects a copy magnification on the basis of this magnification specifying signal (Step S1), determines a sub-scan reading speed (Step S2) and determines a reading clock (Step S3).

Figure 5C:
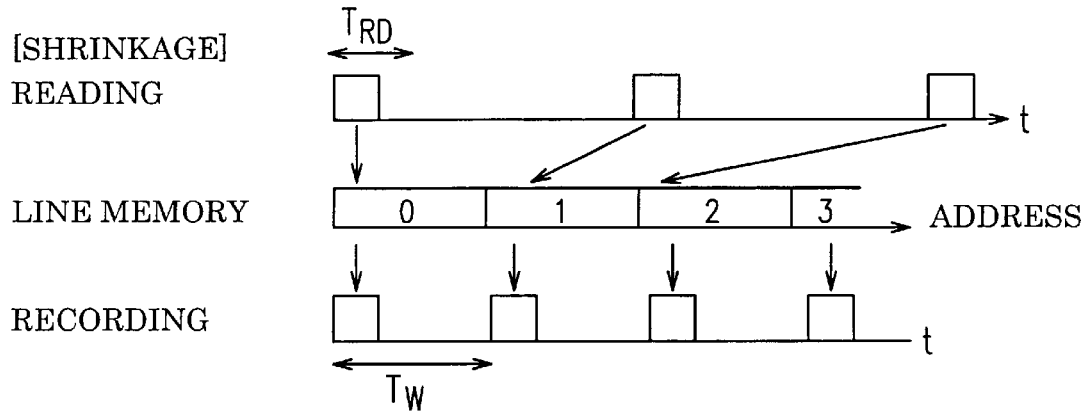

For example, if a shrinkage magnification of 50% is specified, the sub-scan reading speed is set to two times of that in the equivalent magnification copy, and a period (i.e. a cycle) of the reading clock is set to $T_{RD}$ which is two times of a period (i.e. a cycle) Tw of the recording clock, as shown in FIG. 5(C). Then, similarly to the case of the equivalent magnification, the sub-scan reading operation is started (Step S4; YES), and the main scan reading operation is started (Step S5; YES). Moreover, similarly to the case of the equivalent magnification, the inputting process of the signal from the light detector 39 and the writing process of the data to the image processing section (line memory) 13 (Steps S6 to S8) are continued until the main scanning time is ended (Step S9). However, at that time, the data accumulated in the image processing section (line memory) 13 is the data advanced in view of a time, as compared with the case of the equivalent magnification, as shown in FIG. 5(C). Thus, a scan width in the main scanning direction read until the main scanning time is ended (Step S9; YES) becomes two times of that in the case of the equivalent magnification.

However, since the recording clock is constant similarly to the case of the equivalent magnification, the record width from the start of the main scan recording operation to the completion of the line data (Steps S11 to S15) is similar to that in the case of the equivalent magnification, as shown in FIG. 5(C). Hence, since the image information having the scan width which is two times of the case of the equivalent magnification is recorded at the same width as the case of the equivalent magnification, the image is finally shrunk to a half and recorded.

Figure 6D:
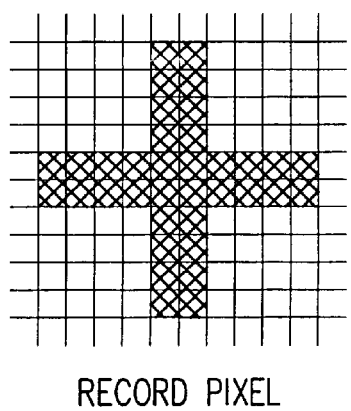

FIG. 6(D) shows a record pixel when the shrinkage process is performed as mentioned above. The example shown in FIG. 6(D) does not imply the case when the shrinkage of 50% is performed as mentioned above. However, it is understood that the record width in the example is shrunk and it is smaller than that of the read pixel shown in FIG. 6(C).

Since the read width in the main scanning direction for the original 54 is varied in conjunction with the enlargement and the shrinkage, a start timing of the reading operation from the BD signal is also varied in conjunction with the enlargement and the shrinkage. For example, in a case of the shrinkage, the reading operation is started at a timing earlier than the case of the equivalent magnification. Contrarily, in a case of the enlargement, the reading operation is started at a timing later than the case of the equivalent magnification.

As explained above, according to this embodiment, since the reading clock is designed to be varied, it is possible to perform the enlarging and shrinking processes without performing the image process using a frame memory. Hence, it is possible to perform the enlargement and shrinkage copy with a high accuracy and a fast speed.

Moreover, it is possible to superimpose the data stored in a memory (not shown) and the read data to thereby apply a digital process to the enlarged and shrunk image. For example, it is possible to perform a superimposing process and the like.

Figure 11:
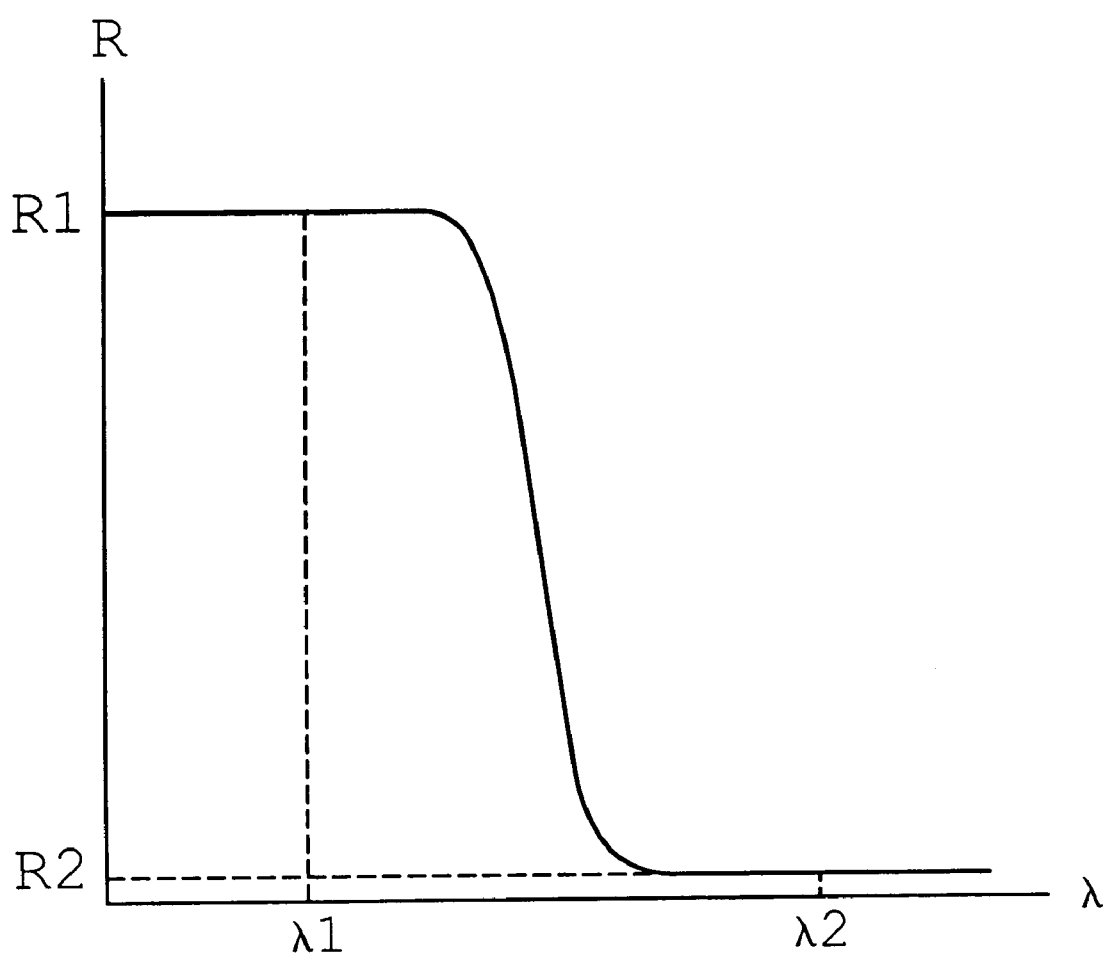
FIG. 11 is a graph of a spectral reflecting property of a dichroic mirror in the first embodiment.

Furthermore, each of the dichroic mirror 45 for synthesizing the recording light flux and the reading light flux used in this embodiment and the dichroic mirror 46 for separating them is an optical element having a function of reflecting or transmitting in accordance with a difference between the wave lengths of the respective light fluxes. FIG.11 shows a characteristic graph showing a spectral reflection characteristic of the element. Then, a horizontal axis indicates a wave length ($\lambda$), and a vertical axis indicates a reflectance (R).

Assuming that the wave length of the light flux emitted by the semiconductor laser 42 servicing as the light source for the reading operation is $\lambda$ 1 and that the wave length of the light flux emitted by the semiconductor laser 33 servicing as the light source for the recording operation is $\lambda$ 2 which is longer than the $\lambda$ 1, a reflectance of the dichroic mirror 45 is R1 for the wave length $\lambda$ 1, and R2 which is lower than R1 for the wave length $\lambda$ 2. The dichroic mirror 46 has a characteristic opposite to that of the dichroic mirror 45. When using an extinction ratio as an index indicative of a wave length separation characteristic of a dichroic mirror, R1/R2 becomes the extinction ratio in this case. For example, when simultaneously performing the image recording operation and the image reading operation, if an efficiency in separating the optical path by the dichroic mirror 46 is low, the reading light flux becomes a stray light and then acts as a bias light on the photo-sensitive drum 20 and thereby has defective influence on a printed image as background contamination. Moreover, it has further defective influence as described below. That is, a light flux corresponding to the signal for modulating the recording semiconductor laser 33 is irradiated to the original 54, and then inputted to the light detector 39 as noise, and thereby the noise is mixed into the read image data.

Then, for example, assuming that an amount of the light irradiated to the original 54 for the image reading operation is 1 mW and that an amount of the light irradiated to the photosensitive drum 20 for the recording operation is 100 $\mu$W, a modulation factor implying a ratio when an amount of the light in recording is turned ON and OFF requires approximately 100 times. Hence, an amount of the light which is allowable as the bias against the photo-sensitive drum 20 is 1 $\mu$W. Consequently, it is desirable that the extinction ratio of the dichroic mirror 46 is at least 1/1000.

The dichroic mirror 45 servicing as one example of the synthesizing device determines an efficiency from the light source and does not need an extinction ratio similar to that of the dichroic mirror 46 servicing as one example of the separating device. Of course, it may be considered to utilize the same part having the same extinction ratio so as to make the efficiency higher. However, in view of a cost, it is advantageous that the dichroic mirror 45 uses a half mirror surface of a metallic single layer film rather than a dielectric multiple-layer film, as a dichroic mirror surface.

The reading semiconductor laser 42 is controlled to be turned on only for the image area in each scanning operation, so that the light flux emitted by the reading semiconductor laser 42 is not inputted to the BD sensor 52. Hence, if an accuracy of the BD signal can be maintained by using the dichroic mirror 46 to separate the optical path, the reading semiconductor laser 42 may be always turned on.

As described in the above mentioned embodiment, it is desirable that the original 54 is read by the visible light. Hence, it is conditional that the wave length of the reading semiconductor laser 42 ranges from 400 nm to 700 nm. However, it is impossible in principle to read the original 54 written with a color including the wave length used in the reading operation. Thus, it is desirable to read by a light having a wave length as short as possible in a practical sense. However, a semiconductor laser oscillating at a wave length equal to or less than 600 nm is not practical at present. For this reason, it is possible to implement a practical laser having a short wave length by using, for example, a non-linear optical element, such as an SHG and the like, in a solid laser light source, such as a semiconductor laser, YAG and the like, to thereby make the wave length shorter.

(Second Embodiment)

A second embodiment of the present invention is explained with reference to FIGS. 12 to 15. In the second embodiment shown in FIGS. 12 to 15, the same constitutional elements as those in the above described first embodiment carry the same reference numerals in FIGS. 12 to 15, and the explanations thereof are omitted.

The second embodiment is constructed to perform enlarging or shrinking by varying the recording clock while the reading clock is set constant.

Figure 12:
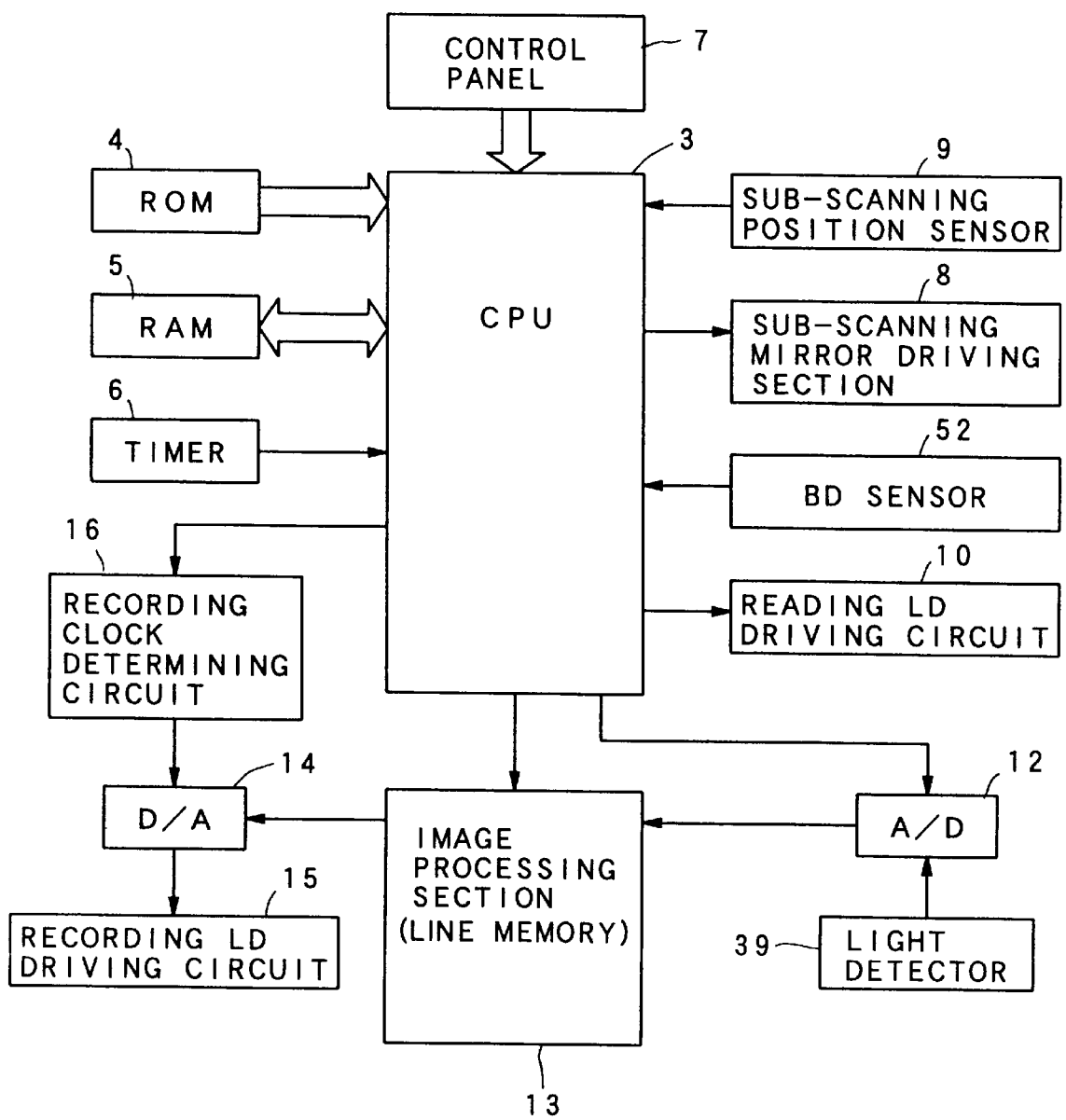
FIG. 12 is a schematic block diagram of a control section of the copier in a second embodiment.

As shown in FIG. 12, a copier as the second embodiment is provided with a recording clock determining circuit 16 in place of the reading clock determining circuit 11 in the first embodiment in FIG. 2, and is constructed such that the CPU 3 outputs a division signal to the recording clock determining circuit 16 and the desired recording clock can be obtained.

Figure 13:
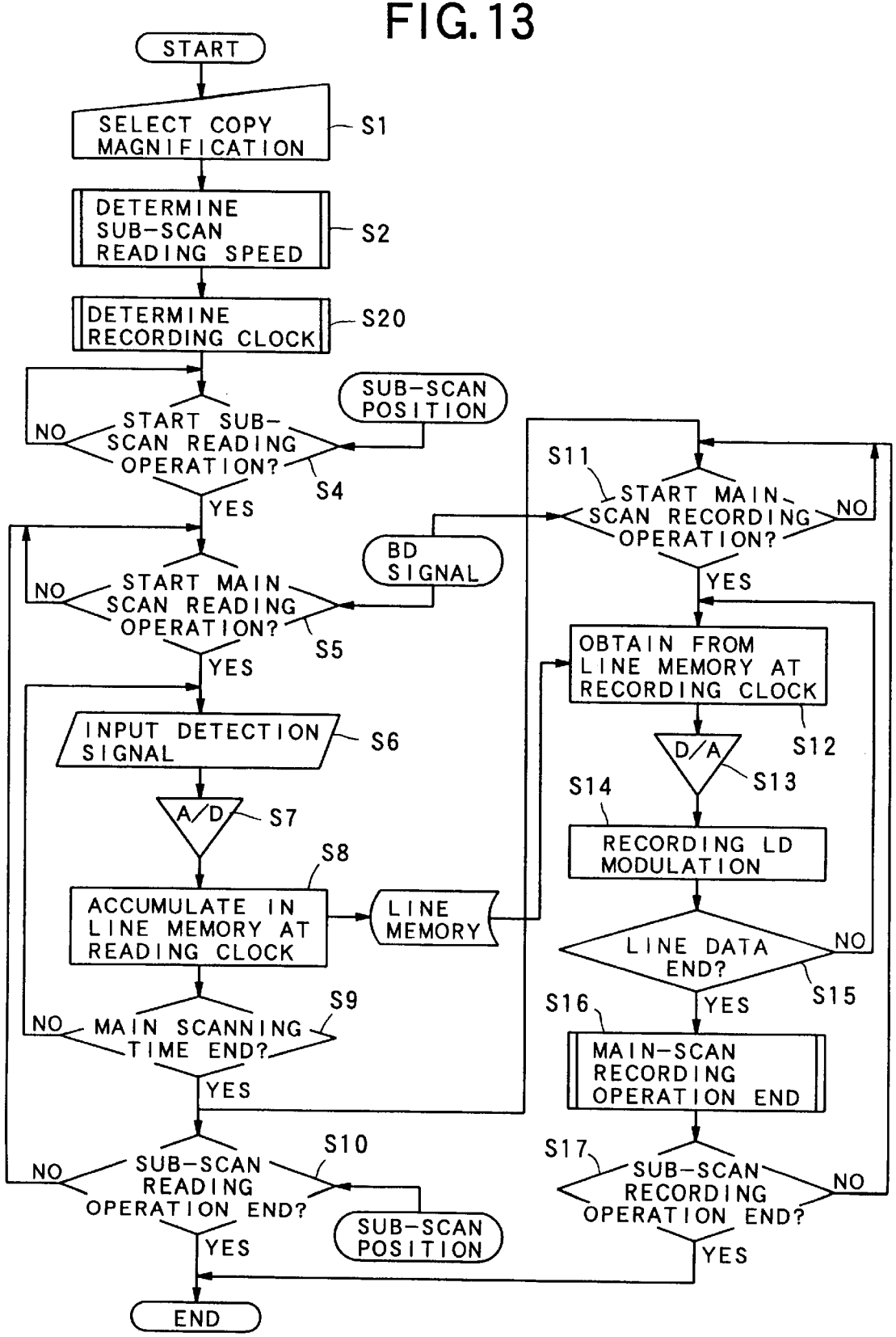
FIG. 13 is a flow chart showing an image reading and recording operations in the second embodiment.

Hereinbelow, a case is explained in which an enlargement copy is performed with reference to FIG. 13. In FIG. 13, the same steps as those in FIG. 4 carry the same step numbers and the detailed explanations thereof are omitted. Incidentally, the case is not explained here in which an equivalent magnification is performed, since the cycles of the reading clock and the recording clock are set equal to each other in this case, so that the operation for the equivalent magnification of the second embodiment is the same as that of the first embodiment as a result.

When an enlargement magnification is specified on the control panel 7 and then the copy start key is pushed down, the CPU 3 selects the copy magnification on the basis of this magnification specifying signal (Step S1), determines the sub-scan reading speed (Step S2) and determines the recording clock (Step S13).

Figure 14A:
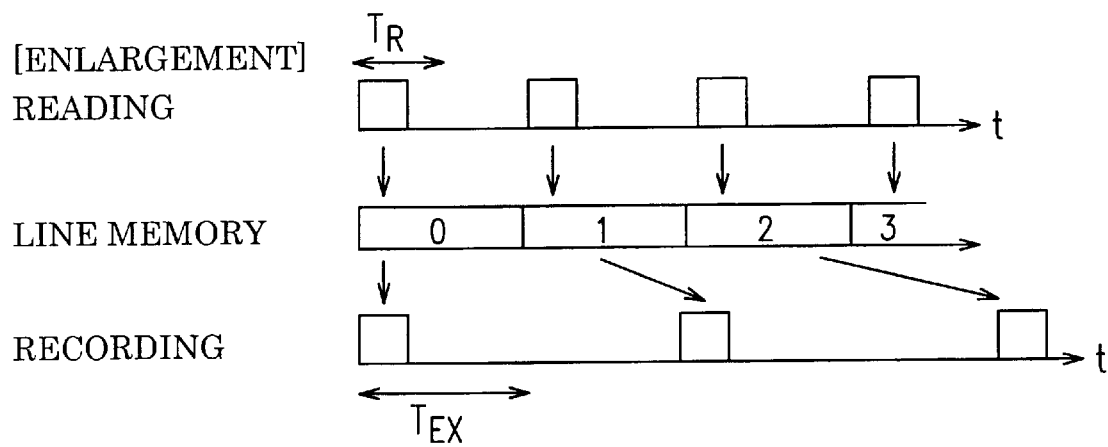
FIGS. 14(A) and 14(B) are timing charts of the enlarging and shrinking operations in the second embodiment.

For example, if the enlargement magnification of 200% is specified, the sub-scan reading speed is set to half of that in the case of the equivalent magnification copy, and a period (i.e. a cycle) of the recording clock is set to $T_{EX}$ which is twice of a period (i.e. a cycle) $T_R$ of the reading clock, as shown in FIG. 14(A).

After that, in FIG. 13 again, the sub-scan reading operation is started (Step S4; YES), and the main scan reading operation is started (Step S5; YES). Moreover, the inputting process of the signal from the light detector 39 and the writing process of the data to the image processing section (line memory) 13 (Steps S6 to S8) are continued until the main scanning time, which is counted by the timer 6, is ended (Step S9). However, at that time, the data accumulated in the image processing section (line memory) 13 is the data corresponding to the reading clock which is constant regardless of the value of the magnification, as shown in FIG. 14(A). A scan width in the main scanning direction read until the main scanning time is ended (Step S9; YES) becomes constant regardless of the value of the magnification.

However, since the period $T_{EX}$ of the recording clock is twice of the period $T_R$ of the reading clock as mentioned above, recording is delayed in time as compared with the case of the equivalent magnification. Therefore, the record width from the start of the main scan recording operation to the completion of the line data (Steps S11 to S15) is twice of that in the case of the equivalent magnification, as shown in FIG. 14(A). Hence, since the image information having the scan width, which is equal to that in the case of the equivalent magnification, is recorded at the width twice of that in the case of the equivalent magnification, the image is finally enlarged to two times and recorded. In the present embodiment, since the maximum recordable size is A4 width size for example, the recording width does not exceed this A4 size width even though it is doubled. For example, while the information read by the A6 size width in the case of the equivalent magnification is recorded by the A6 size width, the information read by the A6 size width in the case of the enlargement is recorded by the A4 size width.

Figure 15A:
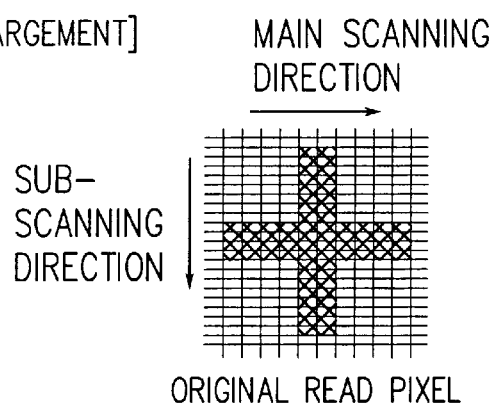
FIGS. 15(A), 15(B), 15(C) and 15(D) are plan views of images respectively in case of performing the enlarging and shrinking operations in the second embodiment.
Figure 15B:
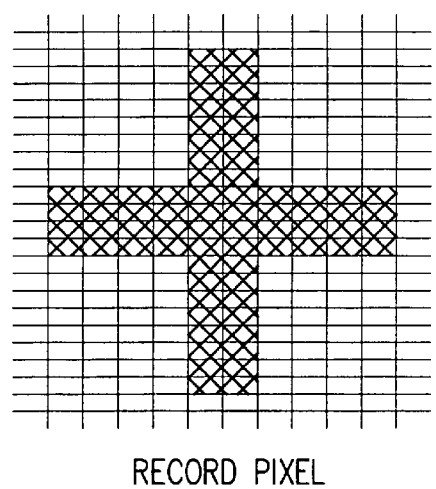
Figure 15C:
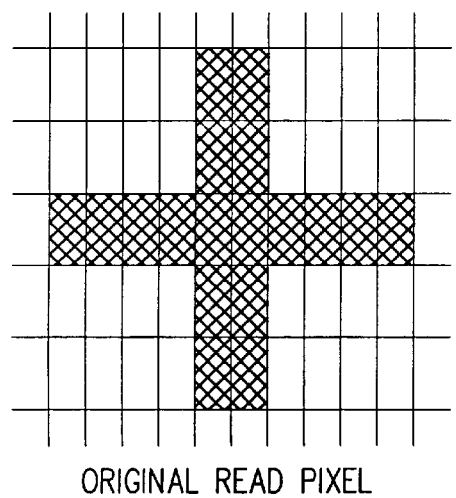

FIG. 15(B) shows a record pixel when the enlarging process is performed as mentioned above. It is understood that the record width in this example is enlarged and it is twice wider than that of the read pixel shown in FIG. 15(A).

Next, a case is explained in which a shrinkage copy is performed with reference to FIG. 13. When a shrinkage magnification is specified on the control panel 7 and then the copy start key is pushed down, the CPU 3 selects a copy magnification on the basis of this magnification specifying signal (Step S1), determines a sub-scan reading speed (Step S2) and determines a recording clock (Step S3).

Figure 14B:
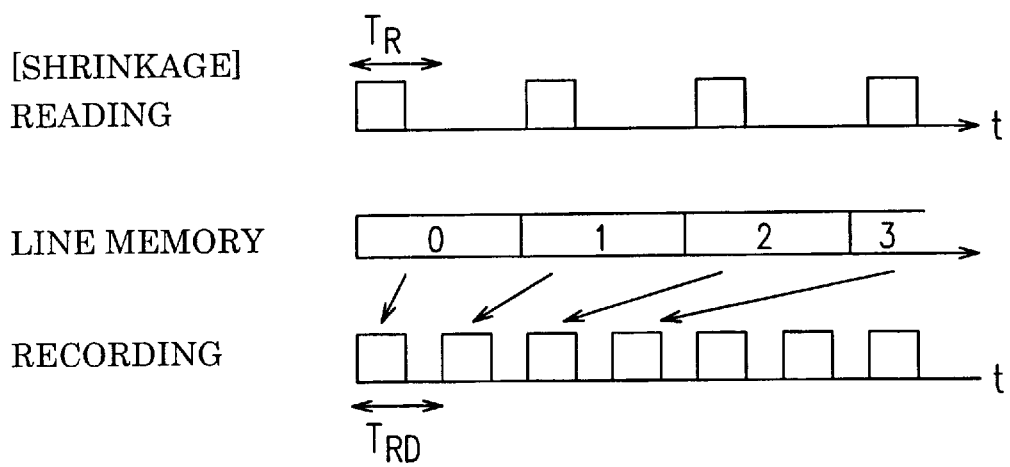

For example, if the enlargement magnification of 50% is specified, the sub-scan reading speed is set to twice of that in the case of the equivalent magnification copy, and a period (i.e. a cycle) of the recording clock is set to $T_{RD}$ which is half of a period (i.e. a cycle) $T_R$ of the reading clock, as shown in FIG. 14(B).

After that, in the same manner as the enlargement, the sub-scan reading operation is started (Step S4; YES), and the main scan reading operation is started (Step S5; YES). Moreover, the inputting process of the signal from the light detector 39 and the writing process of the data to the image processing section (line memory) 13 (Steps S6 to S8) are continued until the main scanning time, which is counted by the timer 6, is ended (Step S9). However, at that time, the data accumulated in the image processing section (line memory) 13 is the data corresponding to the reading clock which is constant regardless of the value of the magnification, as shown in FIG. 14(B). A scan width in the main scanning direction read until the main scanning time is ended (Step S9; YES) becomes constant regardless of the value of the magnification.

However, since the period $T_{RD}$ of the recording clock is half of that in the case of the equivalent magnification, recording is advanced in time as compared with the case of the equivalent magnification. Therefore, the record width from the start of the main scan recording operation to the completion of the line data (Steps S11 to S15) is half of that in the case of the equivalent magnification, as shown in FIG. 14(B). Hence, since the image information having the scan width, which is equal to that in the case of the equivalent magnification, is recorded at the width half of that in the case of the equivalent magnification, the image is finally shrunk to half and recorded.

Figure 15D:
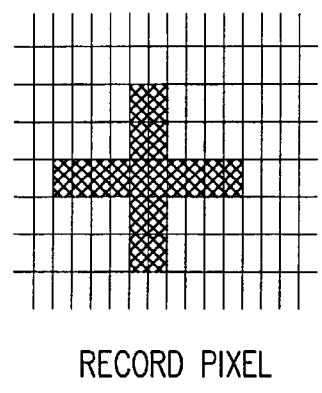

FIG. 15(D) shows a record pixel when the shrinking process is performed as mentioned above. It is understood that the record width in this example is shrunk and it is half of that of the read pixel shown in FIG. 15(C).

As explained above, according to this embodiment, since the recording clock is designed to be varied, it is possible to perform the enlarging and shrinking processes without performing the image process using a frame memory. Hence, it is possible to perform the enlargement and shrinkage copy with a high accuracy and a fast speed.

In the second embodiment, since the read width in the main scanning direction for the original 54 is varied in conjunction with the enlargement and the shrinkage, a start timing of the reading operation from the BD signal is also varied in conjunction with the enlargement and the shrinkage, in the same manner as the first embodiment.

(Third Embodiment)

A third embodiment of the present invention is explained with reference to FIGS. 16 to 19. In the third embodiment shown in FIGS. 16 to 19, the same constitutional elements as those in the above described first embodiment carry the same reference numerals in FIGS. 16 to 19, and the explanations thereof are omitted.

The third embodiment is constructed to perform enlarging or shrinking by performing an interpolating process or a thinning out process while both of the reading clock and the recording clock are set constant.

Figure 16:
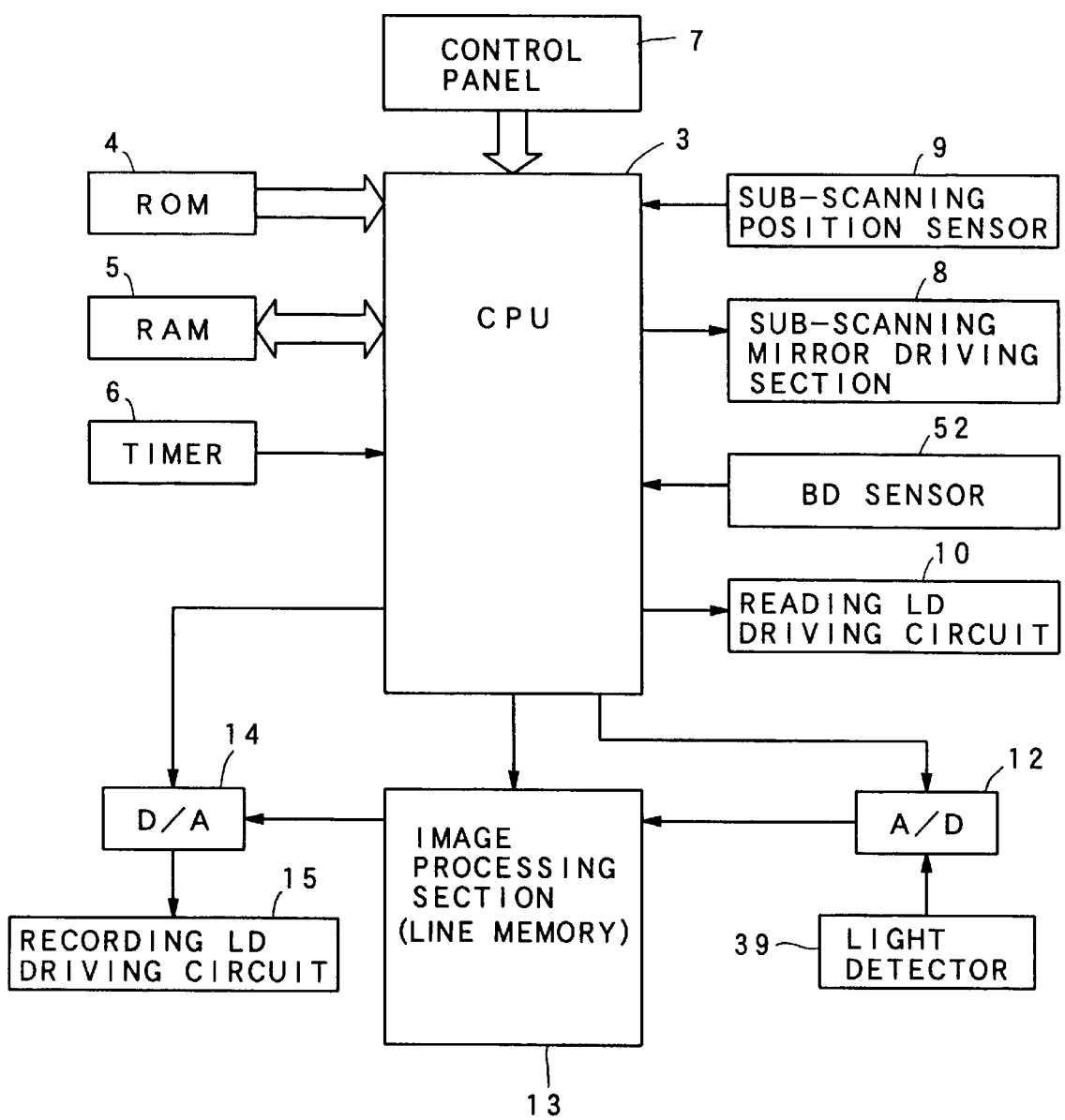
FIG. 16 is a schematic block diagram of a control section of the copier in a third embodiment.

As shown in FIG. 16, a copier as the third embodiment is not provided the reading clock determining circuit 11 in the first embodiment in FIG. 2 or the recording clock determining circuit 16 in the second embodiment in FIG. 12. Instead, the copier is constructed as following. Namely, the copier writes the light detection signal from the light detector 39 into the image processing section (line memory) 13 on the basis of the constant reading clock having the constant cycle after the A/D conversion. The copier reads out the image information from the image processing section (line memory) 13 on the basis of the recording clock having the constant cycle, and controls the recording semiconductor laser via the recording LD driving circuit 15 after the D/A conversion. Then, the copier thins out the image information to be written into the image processing section (line memory) 13, or interpolates the image information, which is stored into or read out from the image processing section (line memory) 13, so as to enlarge or shrink the image.

Figure 17:
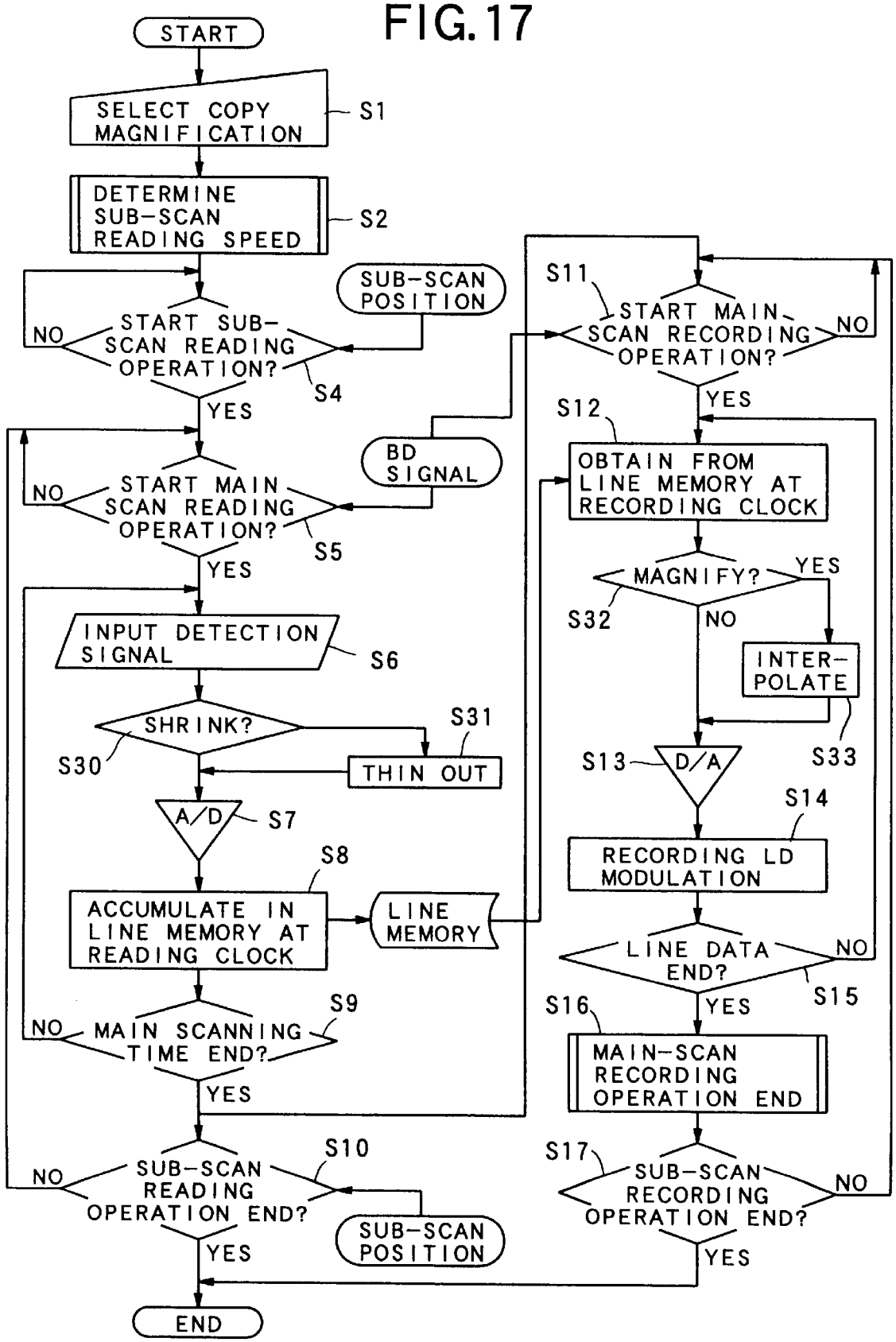
FIG. 17 is a flow chart showing an image reading and recording operations in the third embodiment.

Hereinbelow, operations in the third embodiment is explained with reference to FIGS. 16 to 19. At first, a case is explained in which an enlargement copy is performed with reference to FIG. 17. In FIG. 17, the same steps as those in FIG. 4 carry the same step numbers and the detailed explanations thereof are omitted.

Then an enlargement magnification is specified on the control panel 7 and then the copy start key is pushed down, the CPU 3 selects the copy magnification on the basis of this magnification specifying signal (Step S1), and determines the sub-scan reading speed (Step S2). For example, if the enlargement magnification of 200% is specified, the sub-scan reading speed is set to half of that in the case of the equivalent magnification copy. However, since the reading clock and the recording clock are constant, the clock determining process as in the first or second embodiments (Step S3 or S20) is not performed. After that, the sub-scan reading operation is started (Step S4; YES), and the main scan reading operation is started (Step S5; YES).

Figure 18A:
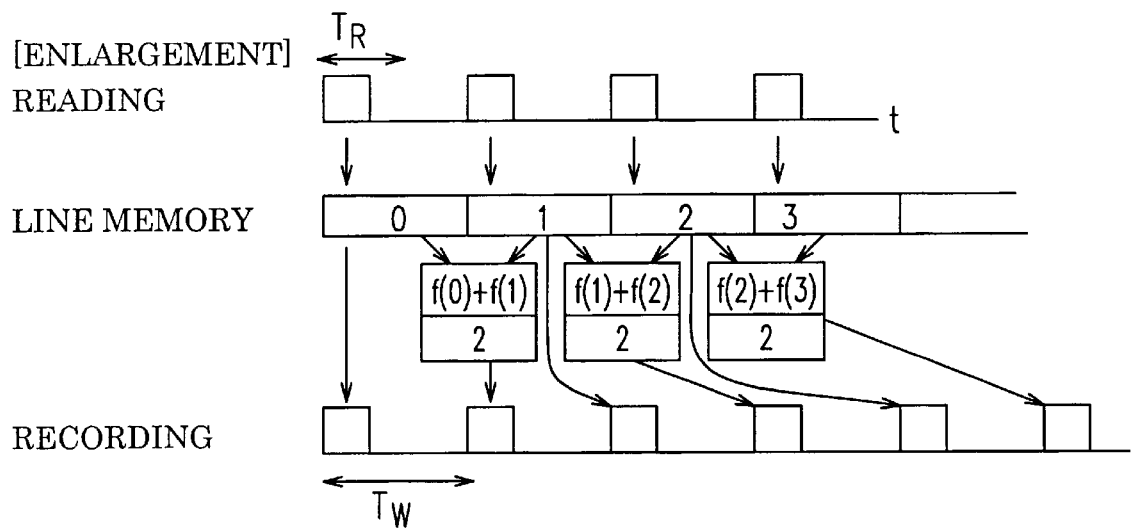
FIGS. 18(A) and 18(B) are timing charts of the enlarging and shrinking operations in the third embodiment.

At this time, since the setting of the magnification does not indicates the shrinkage (step S30: NO), the writing process of the data to the image processing section (line memory) 13 (Steps S6 to S8) on the basis of the reading clock having the constant cycle are continued until the main scanning time is ended (Step S9). At that time, the data accumulated in the image processing section (line memory) 13 is the data corresponding to the reading clock which is constant regardless of the value of the magnification, as shown in FIG. 18(A). A scan width in the main scanning direction read until the main scanning time is ended (Step S9; YES) becomes constant regardless of the value of the magnification.

Then, in the recording operation, the data is read out from the line memory by the recording clock having the constant cycle, and the interpolating process is performed in case that the set magnification is the enlargement magnification (Step S32: YES).

The interpolating process in the present embodiment is such a process to record, assuming that the data at the line memory address n is f(n), the data between n and n+1 as $\{f(N)+f(N+1)\}/2$.

Thus, in the example of FIG. 18(A), between a record position at the line memory address 0 and a record position at the line memory address 1, the data calculated as $\{f(0)+f(1)\}/2$ is recorded. In the same manner, between a record position at the line memory address 1 and a record position at the line memory address 2, the data calculated as $\{f(1)+f(2)\}/2$ is recorded. Between a record position at the line memory address 2 and a record position at the line memory address 3, the data calculated as $\{f(2)+f(3)\}/2$ is recorded.

By performing the above explained interpolating process, the data which has not been interpolated, is delayed in time as compared with the case of the equivalent magnification. Therefore, the record width from the start of the main scan recording operation to the completion of the line data (Steps S11 to S15) is twice of that in the case of the equivalent magnification, as shown in FIG. 18(A). Hence, since the interpolated data exists between the data which has not been interpolated, it is possible to prevent the pixel from becoming coarse or rough. Therefore, since the image information having the scan width, which is equal to that in the case of the equivalent magnification, is recorded at the width twice of that in the case of the equivalent magnification, and since the number of pixels to be recorded is increased, the image is finally enlarged to two times and accurately recorded.

Figure 19A:
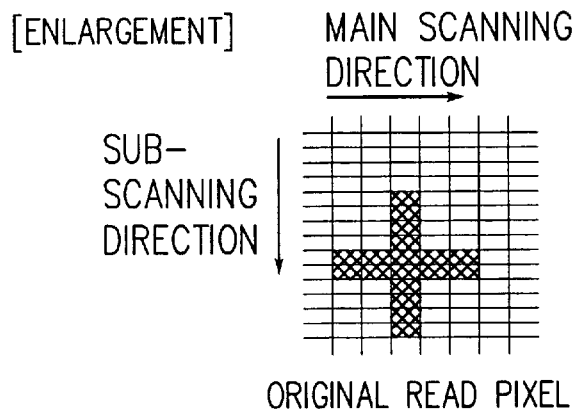
FIGS. 19(A), 19(B), 19(C) and 19(D) are plan views of images respectively in case of performing the enlarging and shrinking operations in the third embodiment.
Figure 19B:
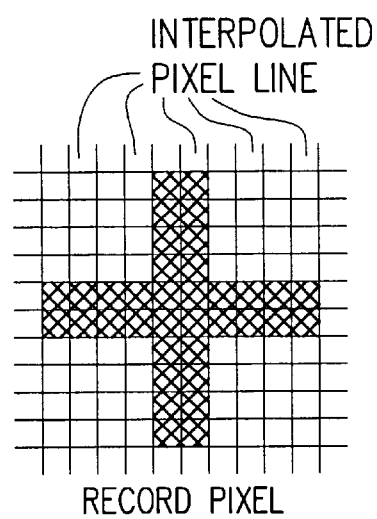
Figure 19C:
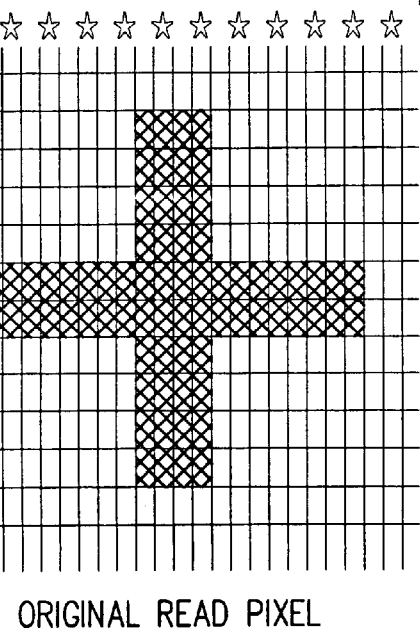

FIG. 19(B) shows a record pixel when the enlarging process is performed as mentioned above. It is understood that the record width in this example is enlarged and it is twice wider than that of the read pixel shown in FIG. 19(A).

Next, a case is explained in which an shrinkage copy is performed with reference to FIG. 17. When an shrinkage magnification is specified on the control panel 7 and then the copy start key is pushed down, the CPU 3 selects the copy magnification on the basis of this magnification specifying signal (Step S1), and determines the sub-scan reading speed (Step S2). For example, if the shrinkage magnification of 50% is specified, the sub-scan reading speed is set to twice of that in the case of the equivalent magnification copy. However, since the reading clock and the recording clock are constant, the clock determining process as in the first or second embodiments (Step S3 or S20) is not performed. After that, the sub-scan reading operation is started (Step S4; YES), and the main scan reading operation is started (Step S5; YES).

At this time, since the setting of the magnification indicates the shrinkage (step S30: YES), the signal is read from the light detector 39 and the thinning out process is performed as following (step S31).

Figure 18B:
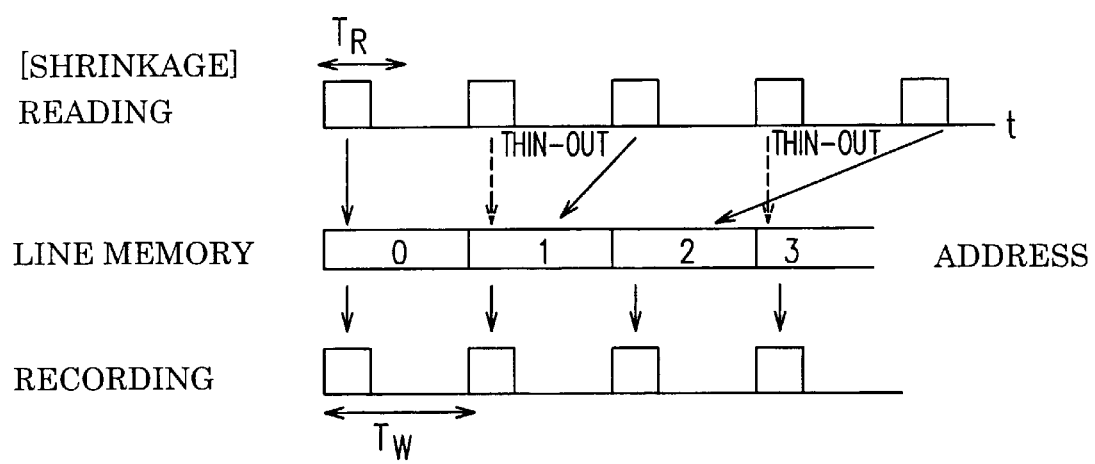

Namely, the thinning out process in the embodiment is, as shown in FIG. 18(B), such a process that some portion of the data read on the basis of the reading clock having the constant cycle is not stored into the line memory. For example, in case of the 50% shrinkage, as shown in FIG. 18(B), writing into the line memory is performed while thinning out every other read data. When the writing operation of the data to the image processing section (line memory) 13 on the basis of the reading clock having the constant cycle (Steps S6 to S8) is continued until the main scanning time is ended (Step S9; YES), the data accumulated on the image processing section (line memory) 13 at this time corresponds to one scanning line. However, the actual scan width becomes twice of that in the case of the equivalent magnification.

Then, the recording operation by use of the recording clock having the constant cycle is performed, the record width from the start of the main scan recording operation to the completion of the line data (Steps S11 to S15) is equal to that in the case of the equivalent magnification, as shown in FIG. 18(B). Hence, since the image information having the scan width, which is twice of that in the case of the equivalent magnification, is recorded at the width equal to that in the case of the equivalent magnification, the image is finally shrunk to half and recorded.

Figure 19D:
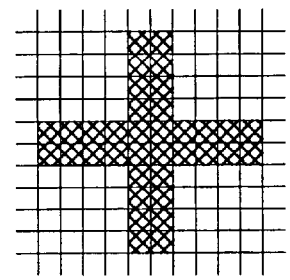

FIG. 19(D) shows a record pixel when the shrinking process is performed as mentioned above. It is understood that the record width in this example is shrunk and it is half of that of the read pixel shown in FIG. 19(C).

As explained above, according to this embodiment, even if the reading clock and the recording clock are set constant, by performing the interpolating process and the thinning out process, it is possible to perform the enlarging and shrinking processes without performing the image process using a frame memory. Hence, it is possible to perform the enlargement and shrinkage copy with a high accuracy and a fast speed. Further, the record pixel can be prevented from becoming coarse or rough in case of the enlargement copy.

In the third embodiment, since the read width in the main scanning direction for the original 54 is varied in conjunction with the enlargement and the shrinkage, a start timing of the reading operation from the BD signal is also varied in conjunction with the enlargement and the shrinkage, in the same manner as the first embodiment.

The above described interpolating and thinning out processes can be used in combination with the first embodiment.

In the present embodiment, although the image information is thinned out at the time of writing the image information to the image processing section (line memory) 13, it is not limited to this. For example, the thinning out process may be performed at the time of reading out the image information from the image processing section (line memory) 13.

Figure 20:
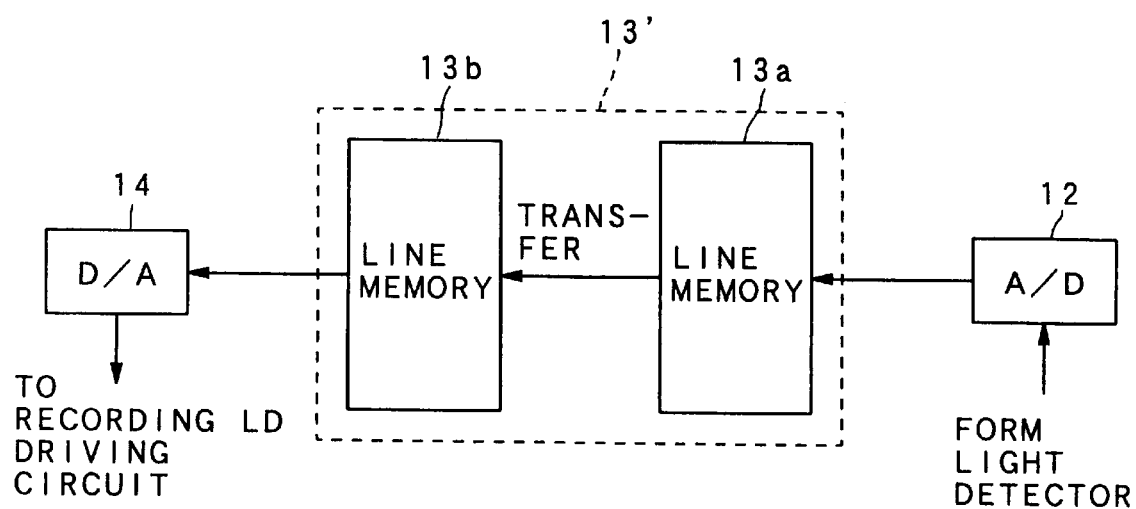
FIG. 20 is a block diagram of a image processing section (line memory) in a modified embodiment.

Further, in the above described embodiment, although the image processing section (line memory) 13 is commonly used for the reading side and the recording side, it is not limited to this. For example, as shown in FIG. 20, an image processing section (line memory) 13' may includes a first memory 13a for the reading side, to which the image information is inputted from the A/D converter 12, and a second memory 13b for the recording side, to which the image information once stored in the first memory 13a is transferred and from which the image information is outputted to the D/A converter 14. Thus, the reading operation and the recording operation can be performed in parallel, so that the enlarging and shrinking processes can be even more speedily performed.

In the embodiments, although the monochrome image is formed, the present invention can effectively function in case of forming a full color image. In this case, as the semiconductor laser for reading the image of the subscript 54, three lasers for three colors of R (Red), G (Green), B (Blue) may be prepared, and the full speed mirror 94 and the half speed mirror 93 or the moving mirror 97 may be reciprocated 3 or 4 times so as to read the image of the subscript 54. Further, as the laser for recording, a monochrome laser may be prepared, and that the developing unit having toners for Y (Yellow), M (Magenta), C (Cyan) and Black may be arranged, so as to form or record the full color image. Alternatively, three lasers for three colors of R, G B may be prepared as the lasers for recording.

In the present embodiments, although the OPC photo-sensitive drum is employed as the photo-sensitive substance, it is not limited to this. For example, a photo-sensitive substance of the selenium dram type, a photo-sensitive substance of a sheet type, which may be produced by vapor-depositing aluminum as a photo-conductive layer on a polyester film, and the like may be employed instead. The moving directions of the photo-sensitive substance and the developing roller may be opposite or same to each other. Further, a photo-sensitive substance on which various latent image other than the electrostatic latent image may be employed. For example, a photo-sensitive substance carrying micro-capsules of light hardening type on the surface thereof may be employed. In this example, the micro capsules which have not been hardened after a light exposure are broken by applying pressure, so as to enable developing.

Furthermore, in the above described embodiments, although the laser copier has been explained, the present invention can also effectively function when it is applied to a multiple functional apparatus having a printer function, a facsimile function and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A copier having a function of enlarging or reducing an image on an original and recording said enlarged or reduced image to a recording medium, said copier comprising:

an original base on which said original is placed;

a reading light beam source that emits a reading light beam;

a reading light beam device that guides said reading light beam onto a reading line on said original, and forms a reading light spot of said reading light beam on said reading line on said original;

a reading light spot moving device that moves said reading light spot on said reading line on said original at a fixed speed;

a light amount detecting device that detects a light amount of a reflected beam from said reading light spot on said original in accordance with a reading cycle, and generates pixel data on the basis of said detected light amount;

an imaging size designating device that designates an image size;

a reading cycle setting device that sets said reading cycle to detect light reflected in a main scanning direction by changing said reading cycle in accordance with said designated image size; and a recording device that performs a recording operation using said pixel data in accordance with a fixed recording cycle, to record said enlarged or reduced image on said recording medium depending on said designated image size, wherein each of said pixel data, which forms said enlarged or reduced image, recorded on said recording medium with said fixed recording cycle by said recording device, corresponds to each of said pixel data which is generated by said light amount detecting device on the basis of said detected light amount of said reflected light beam from said reading light spot on said original in accordance with said reading cycle set by said reading cycle setting device.

2. The copier according to claim 1, wherein the distance between adjacent reading light spots comprising said reading light spot from which said light amount detecting device detects said light amount of a reflected light beam is changed in accordance with the change of said reading cycle while the distance between adjacent pixel data comprising said pixel data which said enlarged or reduced image comprises, recorded on said recording medium by said recording device, is fixed.

3. The copier according to claim 2, wherein said light amount detecting device includes a plurality of light detectors which are disposed at a vicinity of a surface of said original base, and the light detectors are arranged in a direction parallel with a direction in which said reading light spot is moved.

4. The copier according to claim 2 wherein said recording device comprises:

a recording light beam source that emits a recording light beam;

a recording light beam guiding device that guides said recording light beam onto a recording line on said recording medium, and forms a recording light spot of said recording light beam on said recording line on said recording medium;

a recording light spot moving device that moves said recording light spot on said recording line on said recording medium at a fixed speed; and a recording light beam source driving device that drives said recording light beam source to emit said recording light beam modulated on the basis of said pixel data in accordance with the fixed recording cycle.

5. The copier according to claim 4, wherein said reading light beam guiding device and said recording light beam guiding device include:

a light synthesizing device that synthesizes said reading light beam emitted from said reading light source and said recording light beam emitted from said recording light source; and a light separating device that separates said synthesized light beam into said reading light beam and said recording light beam, wherein said reading light beam and said recording light beam are guided through a common path between said light synthesizing device and said light separating device.

6. The copier according to claim 5, wherein said light synthesizing device comprises a dichroic mirror.

7. The copier according to claim 5, wherein said light separating device comprises a dichroic mirror.

8. The copier according to claim 4, wherein said recording light beam source comprises a semiconductor laser.

9. The copier according to claim 4, wherein said recording light spot moving device comprises a polygon mirror which rotates at a constant angular speed.

10. The copier according to claim 2, wherein said recording medium has photo-sensitive micro-capsules.

11. The copier according to claim 2, wherein said recording medium comprises a photo-sensitive drum.

12. The copier according to claim 2, wherein said reading light beam source comprises a semiconductor laser.

13. The copier according to claim 2, wherein said reading light spot moving device comprises a polygon mirror which rotates at a constant angular speed.

14. The copier according to claim 2, wherein said image size designating device comprises a control panel and a central processing unit.

15. The copier according to claim 2, wherein, when said image size designating device designates to enlarge said image size, said reading cycle setting device makes said reading cycle shorter than said recording cycle.

16. The copier according to claim 2, wherein, when said image size designating device designates to reduce said image size, said reading cycle setting device makes said reading cycle longer than said recording cycle.

17. The copier according to claim 2, wherein, when said image size designating device designates to keep an original size of said image on said original, said reading cycle setting device makes said reading cycle equal to said recording cycle.

18. The copier according to claim 2 further comprising a reading line moving device that relatively moves said reading light spot from said reading line to a next reading line on said original.

19. The copier according to claim 18 further comprising a reading line moving speed varying device that varies a moving speed at which said reading light spot is moved from said reading line to said next reading line on said original, in accordance with said designated image size.

* * * * *